(12) United States Patent
Pandit et al.

(10) Patent No.: US 8,606,443 B2
(45) Date of Patent: Dec. 10, 2013

(54) MOTOR ASSISTANCE FOR A HYBRID VEHICLE BASED ON USER INPUT

(75) Inventors: S. B. (Ravi) Pandit, Pune (IN); Tejas Krishna Kshatriya, Pune (IN)

(73) Assignee: KPIT Cummins Infosystems, Ltd., Pune (IN)

( * ) Notice: Subject to any disclaimer, the term of this patent is extended or adjusted under 35 U.S.C. 154(b) by 15 days.

(21) Appl. No.: 12/882,001

(22) Filed: Sep. 14, 2010

(65) Prior Publication Data

US 2011/0087391 A1 Apr. 14, 2011

(30) Foreign Application Priority Data

Sep. 15, 2009 (IN) .................. 2108/MUM/2009
Sep. 15, 2009 (IN) .................. 2109/MUM/2009
Nov. 15, 2009 (WO) ............. PCT/IN2009/000655
Nov. 15, 2009 (WO) ............. PCT/IN2009/000656
Apr. 30, 2010 (IN) .................. 1389/MUM/2010

(51) Int. Cl.
- *B60L 11/00* (2006.01)
- *B60K 1/00* (2006.01)
- *B60K 6/20* (2007.10)
- *B60K 6/485* (2007.10)

(52) U.S. Cl.
CPC . *B60L 11/00* (2013.01); *B60K 1/00* (2013.01); *B60K 6/20* (2013.01); *B60K 6/485* (2013.01)
USPC ....... 701/22; 180/65.1; 180/65.21; 180/65.26

(58) Field of Classification Search
USPC .................. 701/22; 180/65.1–65.31
See application file for complete search history.

(56) References Cited

U.S. PATENT DOCUMENTS

| | | |
|---|---|---|
| 1,402,250 A | 1/1922 | Pieper |
| 2,407,935 A | 9/1946 | Perfetti et al. |
| 4,165,795 A | 8/1979 | Lynch et al. |
| 4,192,279 A | 3/1980 | Maisch et al. |
| 4,242,922 A | 1/1981 | Baudoin |
| 4,286,683 A | 9/1981 | Zeigner et al. |

(Continued)

FOREIGN PATENT DOCUMENTS

| | | |
|---|---|---|
| CA | 2245438 | 2/1999 |
| CA | 2554678 A1 | 1/2008 |

(Continued)

OTHER PUBLICATIONS

Cooper et al., "The UltraBattery—A new battery design for a new beginning in hybrid electric vehicle energy storage", Journal of Power Sources, vol. 188, Issue 2, Mar. 15 2009, pp. 642-649.

(Continued)

*Primary Examiner* — Thomas Tarcza
*Assistant Examiner* — Tyler J Lee
(74) *Attorney, Agent, or Firm* — Foley & Lardner LLP

(57) ABSTRACT

A method of providing assistance for an internal combustion engine in providing driving power for a vehicle using an electric motor coupled to the engine is provided. The method comprises selectively operating the motor to provide assistance to the engine at predetermined operating conditions of the engine. The assistance provided to the engine at one or more of the predetermined operating conditions is determined based on one of a plurality of motor assistance profiles. The motor assistance profile upon which the assistance is determined is selected from among the plurality of motor assistance profiles based on an expected driving range provided by a user of the vehicle.

34 Claims, 19 Drawing Sheets

(56) References Cited

U.S. PATENT DOCUMENTS

| | | | |
|---|---|---|---|
| 4,296,362 A | 10/1981 | Beasley | |
| 4,405,029 A | 9/1983 | Hunt | |
| 4,413,218 A | 11/1983 | Taylor et al. | |
| 4,494,497 A | 1/1985 | Uchida et al. | |
| 4,534,326 A | 8/1985 | Bowcott | |
| 4,749,933 A | 6/1988 | Ben-Aaron | |
| 4,787,043 A | 11/1988 | Zimmerman et al. | |
| 4,883,028 A | 11/1989 | Wu | |
| 4,926,335 A | 5/1990 | Flowers et al. | |
| 5,179,335 A | 1/1993 | Nor | |
| 5,180,279 A | 1/1993 | McLane-Goetz et al. | |
| 5,191,766 A | 3/1993 | Vines | |
| 5,249,637 A | 10/1993 | Heidl et al. | |
| 5,263,379 A | 11/1993 | Newbigging et al. | |
| 5,278,759 A | 1/1994 | Berra et al. | |
| 5,321,597 A | 6/1994 | Alacoque | |
| 5,321,979 A | 6/1994 | McKendry et al. | |
| 5,343,970 A | 9/1994 | Severinsky | |
| 5,378,555 A | 1/1995 | Waters et al. | |
| 5,403,244 A | 4/1995 | Tankersley et al. | |
| 5,420,471 A | 5/1995 | Yun | |
| 5,451,820 A | 9/1995 | Gotoh et al. | |
| 5,473,227 A | 12/1995 | Arnaud et al. | |
| 5,500,584 A | 3/1996 | Shimomoto | |
| 5,542,390 A | 8/1996 | Hartman et al. | |
| 5,587,619 A | 12/1996 | Yumiyama et al. | |
| 5,596,317 A | 1/1997 | Brinkmeyer et al. | |
| 5,635,805 A | 6/1997 | Ibaraki et al. | |
| 5,644,181 A | 7/1997 | Kooken et al. | |
| 5,653,659 A | 8/1997 | Kunibe et al. | |
| 5,661,379 A | 8/1997 | Johnson | |
| 5,675,645 A | 10/1997 | Schwartz et al. | |
| 5,680,031 A | 10/1997 | Pavlovic et al. | |
| 5,712,969 A | 1/1998 | Zimmermann et al. | |
| 5,721,375 A | 2/1998 | Bidner | |
| 5,765,656 A | 6/1998 | Weaver | |
| 5,781,869 A | 7/1998 | Parlett et al. | |
| 5,786,640 A | 7/1998 | Sakai | |
| 5,815,824 A | 9/1998 | Saga et al. | |
| 5,832,896 A | 11/1998 | Phipps | |
| 5,862,497 A | 1/1999 | Yano et al. | |
| 5,862,507 A | 1/1999 | Wu et al. | |
| 5,892,346 A | 4/1999 | Moroto et al. | |
| 5,927,415 A | 7/1999 | Ibaraki et al. | |
| 6,018,199 A | 1/2000 | Shiroyama et al. | |
| 6,022,048 A | 2/2000 | Harshbarger et al. | |
| 6,026,921 A | 2/2000 | Aoyama et al. | |
| 6,037,751 A | 3/2000 | Klang | |
| 6,044,923 A | 4/2000 | Reagan et al. | |
| 6,048,288 A | 4/2000 | Tsujii et al. | |
| 6,083,138 A | 7/2000 | Aoyama et al. | |
| 6,104,971 A | 8/2000 | Fackler | |
| 6,137,203 A | 10/2000 | Jermakian et al. | |
| 6,209,672 B1 | 4/2001 | Severinsky | |
| 6,234,932 B1 | 5/2001 | Kuroda et al. | |
| 6,247,465 B1 | 6/2001 | Sprunger | |
| 6,257,214 B1 | 7/2001 | Bidner et al. | |
| 6,267,706 B1 | 7/2001 | Kuroda et al. | |
| 6,269,290 B1 | 7/2001 | Egami et al. | |
| 6,275,759 B1 | 8/2001 | Nakajima et al. | |
| 6,278,213 B1 | 8/2001 | Bradfield | |
| 6,278,915 B1 | 8/2001 | Deguchi et al. | |
| 6,294,843 B1 | 9/2001 | Kato et al. | |
| 6,295,487 B1 | 9/2001 | Ono et al. | |
| 6,307,277 B1 | 10/2001 | Tamai et al. | |
| 6,314,347 B1 | 11/2001 | Kuroda et al. | |
| 6,315,068 B1 | 11/2001 | Hoshiya et al. | |
| 6,316,842 B1 | 11/2001 | Kuroda et al. | |
| 6,327,852 B1 | 12/2001 | Hirose | |
| 6,333,612 B1 | 12/2001 | Suzuki et al. | |
| 6,343,252 B1 | 1/2002 | Asami et al. | |
| 6,347,608 B1 | 2/2002 | Hara et al. | |
| 6,367,570 B1 * | 4/2002 | Long et al. ................. 180/65.26 | |
| 6,376,927 B1 | 4/2002 | Tamai et al. | |
| 6,380,640 B1 | 4/2002 | Kanamori et al. | |
| 6,422,972 B1 | 7/2002 | Eguchi | |
| 6,427,797 B1 | 8/2002 | Chang | |
| 6,446,745 B1 | 9/2002 | Lee et al. | |
| 6,452,286 B1 | 9/2002 | Kubo et al. | |
| 6,453,865 B2 | 9/2002 | Hirose et al. | |
| 6,463,900 B1 | 10/2002 | Wakabayashi et al. | |
| 6,464,026 B1 | 10/2002 | Horsley et al. | |
| 6,476,532 B1 | 11/2002 | Kennamer | |
| 6,490,491 B1 | 12/2002 | Hartmann et al. | |
| 6,546,455 B1 | 4/2003 | Hurich et al. | |
| 6,555,265 B1 | 4/2003 | Fleming et al. | |
| 6,591,758 B2 | 7/2003 | Kumar | |
| 6,616,569 B2 | 9/2003 | Hoang et al. | |
| 6,617,703 B2 | 9/2003 | Matsubara et al. | |
| 6,622,804 B2 | 9/2003 | Schmitz et al. | |
| 6,655,485 B1 | 12/2003 | Ito et al. | |
| 6,657,315 B1 | 12/2003 | Peters et al. | |
| 6,672,415 B1 | 1/2004 | Tabata | |
| 6,674,198 B2 | 1/2004 | Gubbels | |
| 6,675,078 B2 | 1/2004 | Bitzer et al. | |
| 6,701,880 B1 | 3/2004 | Gauthier et al. | |
| 6,717,378 B2 | 4/2004 | Kitajima et al. | |
| 6,746,366 B2 | 6/2004 | Tamor | |
| 6,769,400 B1 | 8/2004 | Ament | |
| 6,781,251 B2 | 8/2004 | Takaoka et al. | |
| 6,819,169 B1 | 11/2004 | Kunc et al. | |
| 6,823,840 B1 | 11/2004 | Tamai et al. | |
| 6,861,820 B2 | 3/2005 | Gale et al. | |
| 6,876,098 B1 | 4/2005 | Gray, Jr. | |
| 6,930,413 B2 | 8/2005 | Marzano | |
| 7,013,213 B2 | 3/2006 | McGee et al. | |
| 7,028,795 B2 | 4/2006 | Tabata | |
| 7,030,580 B2 | 4/2006 | Hoff | |
| 7,056,251 B2 | 6/2006 | Ibaraki | |
| 7,058,487 B2 | 6/2006 | Hara et al. | |
| 7,130,731 B2 | 10/2006 | Itoh et al. | |
| 7,147,070 B2 | 12/2006 | Leclerc | |
| 7,221,125 B2 | 5/2007 | Ding | |
| 7,226,383 B2 | 6/2007 | Namba | |
| 7,235,029 B2 | 6/2007 | Klemen et al. | |
| 7,268,442 B2 | 9/2007 | Syed et al. | |
| 7,272,484 B1 | 9/2007 | Maeda et al. | |
| 7,276,806 B1 | 10/2007 | Sheidler et al. | |
| 7,295,915 B1 | 11/2007 | Okubo et al. | |
| 7,302,335 B1 | 11/2007 | Xiao et al. | |
| 7,360,615 B2 | 4/2008 | Salman et al. | |
| 7,389,837 B2 | 6/2008 | Tamai et al. | |
| 7,436,081 B2 | 10/2008 | Lane | |
| 7,466,058 B2 | 12/2008 | Dubois et al. | |
| 7,482,767 B2 | 1/2009 | Tether | |
| 7,520,350 B2 | 4/2009 | Hotto | |
| 7,539,562 B2 * | 5/2009 | Maguire et al. ................. 701/22 |
| 7,554,827 B2 | 6/2009 | Wang | |
| 7,559,386 B2 | 7/2009 | Gu et al. | |
| 7,559,387 B2 | 7/2009 | Tamai | |
| 7,595,606 B2 | 9/2009 | Loubeyre | |
| 7,600,595 B2 | 10/2009 | Harris | |
| 7,610,143 B1 | 10/2009 | Boesch | |
| 7,681,676 B2 | 3/2010 | Kydd | |
| 7,740,092 B2 | 6/2010 | Bender | |
| 7,874,395 B2 | 1/2011 | Taji et al. | |
| 7,992,662 B2 | 8/2011 | King et al. | |
| 8,122,986 B2 | 2/2012 | Colvin et al. | |
| 2001/0022245 A1 | 9/2001 | Rogg | |
| 2002/0007975 A1 | 1/2002 | Naito et al. | |
| 2002/0035429 A1 | 3/2002 | Banas | |
| 2002/0069000 A1 | 6/2002 | Nakao | |
| 2002/0074173 A1 | 6/2002 | Morimoto et al. | |
| 2002/0096886 A1 | 7/2002 | Schmitz et al. | |
| 2002/0108794 A1 | 8/2002 | Wakashiro et al. | |
| 2002/0116112 A1 | 8/2002 | Wakashiro et al. | |
| 2002/0144848 A1 | 10/2002 | Schulte | |
| 2002/0179047 A1 | 12/2002 | Hoang et al. | |
| 2002/0179351 A1 | 12/2002 | Shimabukuro et al. | |
| 2002/0185107 A1 | 12/2002 | Kubesh et al. | |
| 2002/0195885 A1 | 12/2002 | Tsuneyoshi et al. | |
| 2003/0009269 A1 | 1/2003 | Graf et al. | |
| 2003/0010548 A1 | 1/2003 | Mesiti et al. | |
| 2003/0087724 A1 | 5/2003 | Seibertz et al. | |

(56) References Cited

U.S. PATENT DOCUMENTS

| | | |
|---|---|---|
| 2003/0094317 A1 | 5/2003 | Takizawa et al. |
| 2003/0098204 A1 | 5/2003 | Mogi |
| 2003/0144773 A1 | 7/2003 | Sumitomo |
| 2003/0173124 A1 | 9/2003 | Okada et al. |
| 2003/0178896 A1 | 9/2003 | Crane |
| 2003/0236611 A1 | 12/2003 | James et al. |
| 2004/0030471 A1 | 2/2004 | Faye |
| 2004/0046525 A1 | 3/2004 | Gale et al. |
| 2004/0152558 A1 | 8/2004 | Takami et al. |
| 2004/0160141 A1 | 8/2004 | Dube |
| 2004/0169497 A1 | 9/2004 | Colley |
| 2005/0027413 A1 | 2/2005 | Kuroda et al. |
| 2005/0065703 A1 | 3/2005 | Assaf et al. |
| 2005/0079068 A1 | 4/2005 | Shigematsu |
| 2005/0079951 A1 | 4/2005 | Gonzalez |
| 2005/0120785 A1 | 6/2005 | Shin |
| 2005/0137770 A1 | 6/2005 | Hosler et al. |
| 2005/0165522 A1 | 7/2005 | Lehner et al. |
| 2005/0200463 A1 | 9/2005 | Situ et al. |
| 2005/0228553 A1* | 10/2005 | Tryon ............................ 701/22 |
| 2005/0235743 A1 | 10/2005 | Stempnik et al. |
| 2005/0235955 A1 | 10/2005 | Katrak et al. |
| 2005/0240338 A1 | 10/2005 | Ardisana |
| 2005/0274553 A1 | 12/2005 | Salman et al. |
| 2006/0000650 A1 | 1/2006 | Hughey |
| 2006/0017347 A1 | 1/2006 | Rahman |
| 2006/0030450 A1 | 2/2006 | Kyle |
| 2006/0055275 A1 | 3/2006 | Shim et al. |
| 2006/0069490 A1 | 3/2006 | Mladenovic et al. |
| 2006/0113127 A1 | 6/2006 | Dong et al. |
| 2006/0113129 A1 | 6/2006 | Tabata |
| 2006/0166783 A1 | 7/2006 | Tamai et al. |
| 2006/0186738 A1 | 8/2006 | Noguchi et al. |
| 2006/0217229 A1 | 9/2006 | Ogata |
| 2006/0235588 A1 | 10/2006 | Krimmer et al. |
| 2006/0283642 A1 | 12/2006 | Hickam |
| 2006/0290216 A1 | 12/2006 | Burse |
| 2007/0061024 A1 | 3/2007 | Ceskutti |
| 2007/0095587 A1 | 5/2007 | DuCharme |
| 2007/0096683 A1 | 5/2007 | Izumi et al. |
| 2007/0112496 A1 | 5/2007 | Ji |
| 2007/0141465 A1 | 6/2007 | Honbo et al. |
| 2007/0161455 A1 | 7/2007 | King et al. |
| 2007/0162200 A1 | 7/2007 | Zillmer et al. |
| 2007/0163819 A1 | 7/2007 | Richter et al. |
| 2007/0169970 A1 | 7/2007 | Kydd |
| 2007/0175681 A1 | 8/2007 | King et al. |
| 2007/0184928 A1 | 8/2007 | Yasui et al. |
| 2007/0208467 A1 | 9/2007 | Maguire et al. |
| 2007/0210743 A1 | 9/2007 | Tabei et al. |
| 2007/0222408 A1 | 9/2007 | Hughes |
| 2007/0240922 A1 | 10/2007 | Kikuchi |
| 2007/0251748 A1 | 11/2007 | Downs et al. |
| 2007/0275819 A1 | 11/2007 | Hirata |
| 2007/0284164 A1 | 12/2007 | Hamstra et al. |
| 2007/0298928 A1 | 12/2007 | Yamanaka et al. |
| 2008/0004780 A1 | 1/2008 | Watanabe et al. |
| 2008/0021628 A1 | 1/2008 | Tryon |
| 2008/0058154 A1 | 3/2008 | Ashizawa et al. |
| 2008/0060859 A1 | 3/2008 | Klemen et al. |
| 2008/0093136 A1 | 4/2008 | Miller |
| 2008/0093143 A1 | 4/2008 | Harrison |
| 2008/0116759 A1 | 5/2008 | Lin |
| 2008/0121211 A1 | 5/2008 | Livshiz et al. |
| 2008/0149079 A1 | 6/2008 | Jefford et al. |
| 2008/0156550 A1 | 7/2008 | Wei et al. |
| 2008/0204289 A1 | 8/2008 | Miettinen |
| 2008/0210187 A1 | 9/2008 | Sugano et al. |
| 2008/0236910 A1 | 10/2008 | Kejha et al. |
| 2008/0236917 A1 | 10/2008 | Abe et al. |
| 2008/0264398 A1 | 10/2008 | Schondorf et al. |
| 2008/0276610 A1 | 11/2008 | McDowell |
| 2008/0278117 A1 | 11/2008 | Tarchinski |
| 2008/0288153 A1 | 11/2008 | Bauerle et al. |
| 2008/0306643 A1 | 12/2008 | Hanyu et al. |
| 2008/0318728 A1 | 12/2008 | Soliman et al. |
| 2008/0319594 A1 | 12/2008 | Shibata et al. |
| 2008/0319596 A1 | 12/2008 | Yamada |
| 2009/0018716 A1 | 1/2009 | Ambrosio |
| 2009/0024263 A1 | 1/2009 | Simon et al. |
| 2009/0026876 A1 | 1/2009 | Atkinson et al. |
| 2009/0062050 A1 | 3/2009 | Hayashi |
| 2009/0079394 A1 | 3/2009 | Richards et al. |
| 2009/0096423 A1 | 4/2009 | Aswani et al. |
| 2009/0115282 A1 | 5/2009 | Nishidate et al. |
| 2009/0120700 A1 | 5/2009 | Fukumura |
| 2009/0127008 A1 | 5/2009 | Batdorf |
| 2009/0128069 A1 | 5/2009 | Kaneko et al. |
| 2009/0143950 A1 | 6/2009 | Hasegawa et al. |
| 2009/0150055 A1 | 6/2009 | Kaiser et al. |
| 2009/0150059 A1 | 6/2009 | Santoso et al. |
| 2009/0171522 A1 | 7/2009 | Luo et al. |
| 2009/0187305 A1 | 7/2009 | Krauter et al. |
| 2009/0198398 A1 | 8/2009 | Yamada |
| 2009/0204280 A1 | 8/2009 | Simon, Jr. et al. |
| 2009/0223725 A1 | 9/2009 | Rodriguez et al. |
| 2009/0230900 A1 | 9/2009 | Bae et al. |
| 2009/0255741 A1 | 10/2009 | Major et al. |
| 2009/0295451 A1 | 12/2009 | Jordanger et al. |
| 2009/0314109 A1 | 12/2009 | Tu |
| 2009/0322503 A1 | 12/2009 | Suzuki et al. |
| 2009/0325068 A1 | 12/2009 | Boden et al. |
| 2009/0326750 A1 | 12/2009 | Ang |
| 2010/0009263 A1 | 1/2010 | Gerber |
| 2010/0044129 A1 | 2/2010 | Kyle |
| 2010/0052888 A1 | 3/2010 | Crowe et al. |
| 2010/0057280 A1 | 3/2010 | Crowe et al. |
| 2010/0057281 A1 | 3/2010 | Lawyer et al. |
| 2010/0060236 A1 | 3/2010 | Delaille et al. |
| 2010/0139998 A1 | 6/2010 | Schondorf |
| 2010/0222953 A1 | 9/2010 | Tang |
| 2010/0296204 A1 | 11/2010 | Ichikawa et al. |
| 2011/0029168 A1* | 2/2011 | Talberg ............................ 701/22 |
| 2011/0087392 A1 | 4/2011 | Kshatriya |
| 2011/0166731 A1 | 7/2011 | Kristinsson et al. |
| 2011/0246005 A1 | 10/2011 | King et al. |
| 2011/0264317 A1 | 10/2011 | Druenert et al. |
| 2012/0035795 A1* | 2/2012 | Yu et al. ............................ 701/22 |

FOREIGN PATENT DOCUMENTS

| | | |
|---|---|---|
| CN | 101121406 | 2/2008 |
| CN | 201290031 | 8/2009 |
| CN | 201359033 | 12/2009 |
| DE | 44 12 438 C1 | 11/1995 |
| DE | 199 06 601 A1 | 9/1999 |
| DE | 199 50 080 A1 | 5/2000 |
| DE | 100 43 409 A1 | 4/2001 |
| DE | 101 03 188 A1 | 8/2002 |
| DE | 103 33 210 | 1/2005 |
| DE | 1020040 60 078 A1 | 7/2006 |
| DE | 10 2005 041634 A1 | 12/2006 |
| DE | 10 2006 028333 A1 | 12/2006 |
| DE | 10 2006 060889 A1 | 12/2006 |
| DE | 10 2006 018624 A1 | 10/2007 |
| DE | 1020070 01 841 A1 | 5/2008 |
| EP | 0 755 816 A2 | 1/1997 |
| EP | 913287 A2 | 5/1999 |
| EP | 0 926 030 A2 | 6/1999 |
| EP | 0 992 678 A1 | 4/2000 |
| EP | 1 101 644 A2 | 5/2001 |
| EP | 1 256 476 | 11/2002 |
| EP | 1 270 303 A1 | 1/2003 |
| EP | 1369279 A1 | 10/2003 |
| EP | 1 283 583 A2 | 8/2005 |
| EP | 1 577 139 A2 | 9/2005 |
| EP | 1 953 058 A1 | 8/2008 |
| EP | 1 975 028 A2 | 10/2008 |
| EP | 1 975 028 A3 | 4/2009 |
| EP | 2 090 486 A1 | 8/2009 |
| EP | 2 102 029 | 9/2009 |
| EP | 2168827 A1 | 3/2010 |
| FR | 2835661 | 8/2003 |
| FR | 2799697 A1 | 1/2004 |

(56) References Cited

FOREIGN PATENT DOCUMENTS

| | | |
|---|---|---|
| GB | 2 279 183 | 12/1994 |
| GB | 2 418 898 | 4/2006 |
| GB | 2 440 321 | 1/2008 |
| JP | 58-067940 | 4/1983 |
| JP | 59-119043 | 7/1984 |
| JP | 61-205374 | 9/1986 |
| JP | 7231506 | 8/1995 |
| JP | 7315078 | 12/1995 |
| JP | 8142886 A | 6/1996 |
| JP | 8310253 | 11/1996 |
| JP | 907601 | 4/1997 |
| JP | 10129298 | 5/1998 |
| JP | 11262105 | 9/1999 |
| JP | 2000030749 | 1/2000 |
| JP | 2001 047880 A | 2/2001 |
| JP | 2001069606 | 3/2001 |
| JP | 2001140670 | 5/2001 |
| JP | 2001 231103 A | 8/2001 |
| JP | 2001238305 | 8/2001 |
| JP | 2000333305 | 11/2001 |
| JP | 2002 262404 A | 9/2002 |
| JP | 2004248455 | 9/2004 |
| JP | 2004285866 | 10/2004 |
| JP | 2004353630 | 12/2004 |
| JP | 2005155582 | 6/2005 |
| JP | 2005192349 | 7/2005 |
| JP | 2006112311 | 4/2006 |
| JP | 2006233977 | 9/2006 |
| JP | 2007069625 | 3/2007 |
| JP | 2007181370 | 7/2007 |
| JP | 2008162318 | 7/2008 |
| JP | 2008164341 | 7/2008 |
| JP | 2008174019 | 7/2008 |
| JP | 2008273460 | 11/2008 |
| JP | 2009134497 | 6/2009 |
| JP | 2009143553 | 7/2009 |
| KR | 100267328 | 10/2000 |
| KR | 2003050447 | 3/2003 |
| KR | 2005118403 | 6/2007 |
| KR | 2007024827 | 9/2008 |
| KR | 2009065303 | 6/2009 |
| SU | 1410194 | 7/1988 |
| SU | 1674316 | 8/1991 |
| WO | WO 96/01193 A1 | 1/1996 |
| WO | WO 98/17494 | 4/1998 |
| WO | WO 00/15455 A2 | 3/2000 |
| WO | WO 2007/074745 A1 | 12/2005 |
| WO | WO 2006/020476 A2 | 2/2006 |
| WO | WO 2006/052719 A2 | 5/2006 |
| WO | WO 2007/023001 A1 | 3/2007 |
| WO | WO 2007/040629 A2 | 4/2007 |
| WO | WO 2008/038466 A1 | 4/2008 |
| WO | WO 2008/007120 A2 | 7/2008 |
| WO | WO 2008/113186 A1 | 9/2008 |
| WO | WO 2009/008477 A1 | 1/2009 |
| WO | WO 2009/065656 A1 | 5/2009 |
| WO | WO 2009/078835 A1 | 6/2009 |
| WO | WO 2009/121613 A1 | 10/2009 |
| WO | WO 2009/019580 A2 | 12/2009 |
| WO | WO 2009/149041 A1 | 12/2009 |

OTHER PUBLICATIONS

Isastia et al., "Overview on Automotive Energy Storage Systems", International Review of Electrical Engineering, vol. 4, Issue 6, Nov. 2009, pp. 1122-1145.
Kitt, Oliver, "Bypassing ECU functions using XCP stimulation mechanism", ECE, Jun. 2005, pp. 37-39.
Kowal et al., "Simulation of the current distribution in lead-acid batteries to investigate the dynamic charge acceptance in flooded SLI batteries", Journal of Power Sources, vol. 191, Issue 1, Jun. 1 2009, pp. 42-50.
Moseley et al., "Lead-acid battery chemistry adapted for hybrid electric vehicle duty", Journal of Power Sources, vol. 174, Issue 1, Nov. 22, 2007, pp. 49-53.
Moseley, P.T, "Consequences of including carbon in the negative plates of Valve-regulated Lead-Acid batteries exposed to high-rate partial-state-of-charge operation", Journal of Power Sources, vol. 191, Issue 1, Jun. 1 2009, pp. 134-138.
Soria et al., "New developments on valve-regulated lead-acid batteries for advanced automotive electrical systems", Journal of Power Sources, vol. 144, Issue 2, Jun. 15 2005, pp. 473-485.
Sorrentino et al., "Control Oriented Modeling of Solid Oxide Fuel Cell Auxiliary Power Unit for Transportation Applications", Journal of Fuel Cell Science and Technology, vol. 6, Issue 4, Nov. 2009, 12 pages.
PCT International Search Report of International Application No. PCT/IN2010/000608; mailed Apr. 4, 2011; 4 pages.
PCT International Search Report of International Application No. PCT/IN2010/000609; mailed May 23, 2011; 7 pages.
PCT International Search Report of International Application No. PCT/IN2010/000614; mailed Apr. 6, 2011; 4 pages.
PCT International Search Report of International Application No. PCT/IN2010/000616; mailed Mar. 28, 2011; 4 pages.
PCT International Search Report of International Application No. PCT/IN2010/000619; mailed Apr. 11, 2011; 5 pages.
PCT International Search Report of International Application No. PCT/IN2009/000655; mailed Mar. 22, 2011; 5 pages.
PCT International Search Report of International Application No. PCT/IN2009/000656; mailed May 18, 2010; 5 pages.
Final Office Action dated Jun. 27, 2013 in U.S. Appl. No. 12/882,003.
Notice of Allowance dated Jun. 26, 2013 in U.S. Appl. No. 13/496,161.

* cited by examiner

| Available Charge | Driving Range | | | |
|---|---|---|---|---|
| | 40 Km | 60 Km | 80 Km | 100 Km |
| 70% | 120% | 100% | 85% | 60% |
| 55% | 90% | 80% | 65% | 55% |
| 40% | 70% | 60% | 50% | 40% |
| 25% | 50% | 40% | 30% | 20% |

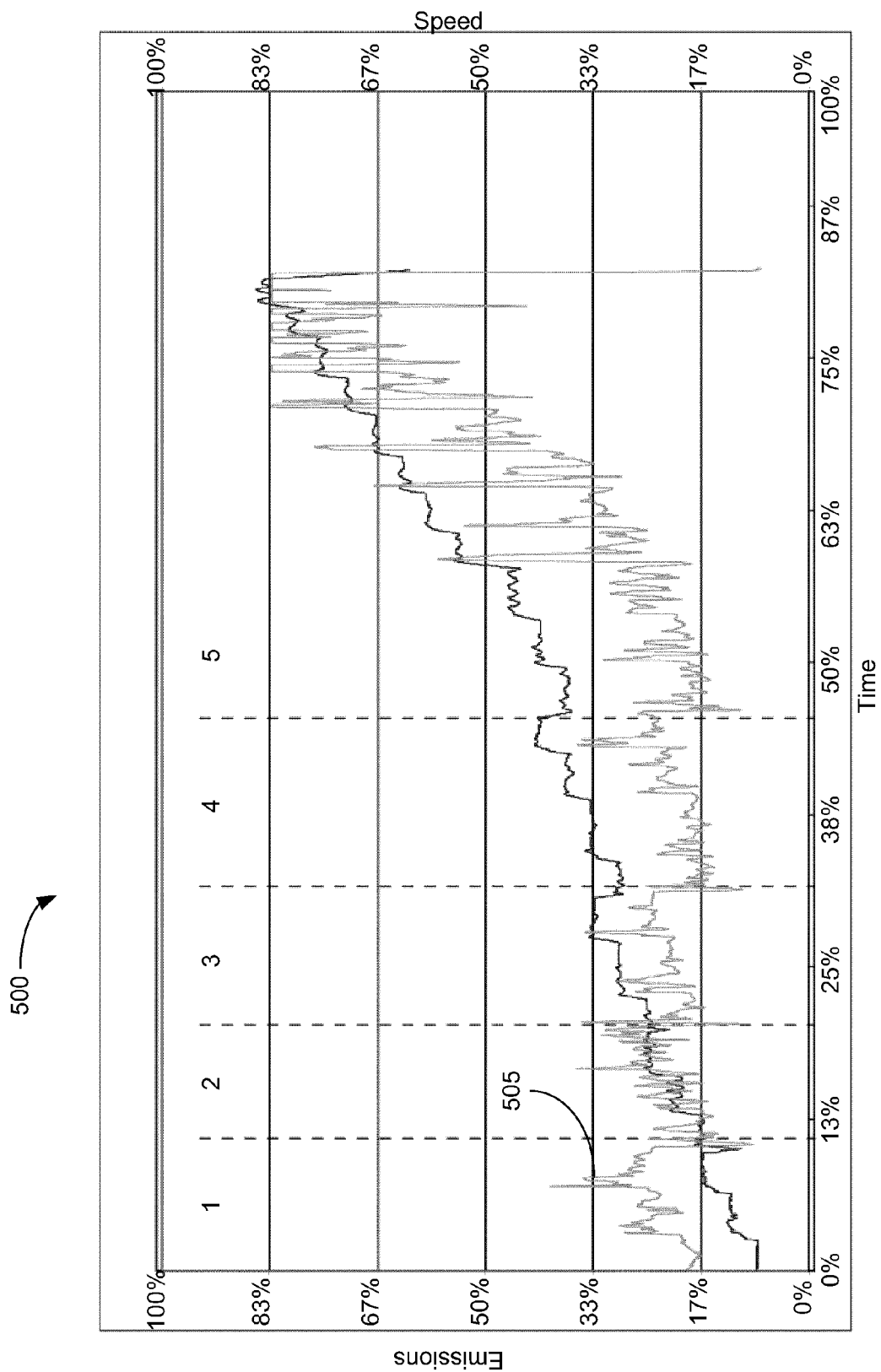

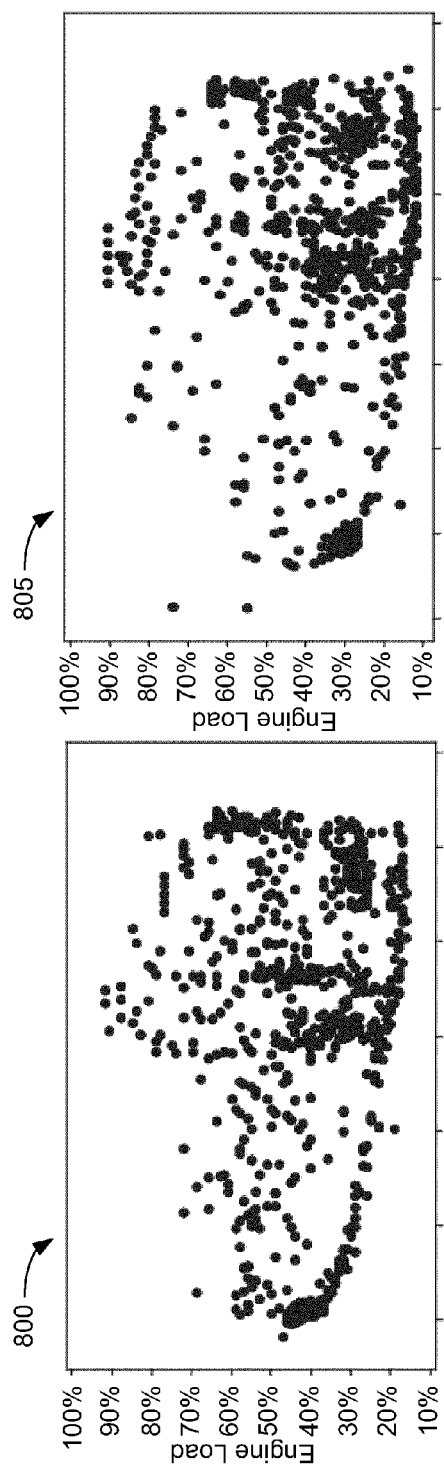
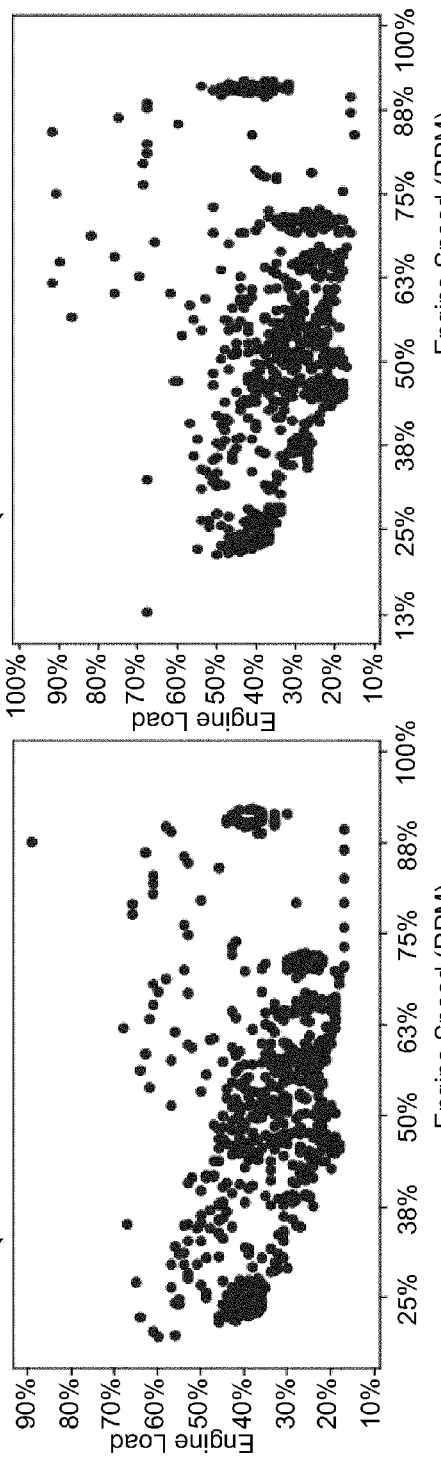

MOTOR ASSISTANCE FOR A HYBRID VEHICLE BASED ON USER INPUT

CROSS-REFERENCE TO RELATED APPLICATIONS

The present application claims priority to and the benefit of the following patent applications, the disclosures of which are incorporated herein by reference in their entireties: Indian Patent Application No. 2108/MUM/2009, filed Sep. 15, 2009; Indian Patent Application No. 2109/MUM/2009, filed Sep. 15, 2009; International Application No. PCT/IN2009/000655, filed Nov. 15, 2009; International Patent Application No. PCT/IN2009/000656, filed Nov. 15, 2009; and Indian Patent Application No. 1389/MUM/2010, filed Apr. 30, 2010.

BACKGROUND

The present disclosure relates generally to the field of vehicle powertrain systems. More particularly, the present disclosure relates to hybrid vehicle powertrain systems utilizing an engine and a motor.

Most vehicles currently on the road require a relatively large internal combustion engine to produce power needed for rapid acceleration. The engine on a standard vehicle is typically sized for the peak power requirement. However, most drivers use the peak power of their engines for only a small portion (e.g., one percent) of their driving time. Large engines may be heavy and inefficient and may result in higher emissions and/or lower fuel economy.

Vehicle efficiency may be improved through the use of a hybrid system that utilizes both an electric motor and an engine. In some hybrid systems, an electric motor may provide power to drive the vehicle over a certain range of operating conditions and an engine may provide power to drive the vehicle over a different range of operating conditions (i.e., such that only one of the motor and the engine provide power at any given time). In other hybrid systems, a motor may assist an engine in providing power to drive the vehicle. Hybrid systems may be capable of delivering required power with a smaller engine than non-hybrid systems. Small engines may be lighter, have fewer cylinders, and/or normally operate closer to their maximum load than large engines. The use of small engines may improve the efficiency (e.g., emissions, fuel economy) of a vehicle.

It would be advantageous to provide an improved hybrid system for a vehicle that provides improved fuel economy and reduced emissions as compared to current hybrid systems.

SUMMARY

An exemplary embodiment relates to a method of providing assistance for an internal combustion engine in providing driving power for a vehicle using an electric motor coupled to the engine. The method comprises selectively operating the motor to provide assistance to the engine at predetermined operating conditions of the engine. The assistance provided to the engine at one or more of the predetermined operating conditions is determined based on one of a plurality of motor assistance profiles. The motor assistance profile upon which the assistance is determined is selected from among the plurality of motor assistance profiles based on an expected driving range provided by a user of the vehicle.

Another exemplary embodiment relates to a motor controller. The motor controller comprises one or more processors configured to execute instructions stored on one or more computer-readable media. The instructions are executable by the one or more processors to selectively operate an electric motor to provide assistance to an internal combustion engine at predetermined operating conditions of the engine. The assistance provided to the engine at one or more of the predetermined operating conditions is determined based on one of a plurality of motor assistance profiles. The motor assistance profile upon which the assistance is determined is selected from among the plurality of motor assistance profiles based on an expected driving range provided by a user of the vehicle.

Another exemplary embodiment relates to a hybrid drive system for a vehicle. The hybrid drive system comprises an electric motor configured to provide assistance to an internal combustion engine to provide driving power for the vehicle. The hybrid drive system further comprises a controller configured to control an operation of an electric motor. The controller comprises one or more processors configured to execute instructions stored on one or more computer-readable media. The instructions are executable by the one or more processors to selectively operate an electric motor to provide assistance to an internal combustion engine at predetermined operating conditions of the engine. The assistance provided to the engine at one or more of the predetermined operating conditions is determined based on one of a plurality of motor assistance profiles. The motor assistance profile upon which the assistance is determined is selected from among the plurality of motor assistance profiles based on an expected driving range provided by a user of the vehicle.

BRIEF DESCRIPTION OF THE DRAWINGS

FIG. 4B is a motor assistance table illustrating the average assistance that may be provided at different available energy levels and driving ranges for an exemplary set of motor assistance profiles according to one exemplary embodiment.

FIG. 5 is a graphical representation of emissions data resulting from an emissions test with assistance provided by a motor according to an exemplary embodiment.

FIGS. 8A through 8D are graphical representations of the efficiency of a sample engine under various operating conditions according to exemplary embodiments.

DETAILED DESCRIPTION

Referring generally to the figures, systems and methods for assisting an engine in providing driving power for a vehicle are described according to various exemplary embodiments. A motor is coupled to the engine and is configured to assist the engine in providing driving power for the vehicle. The motor may be selectively controlled to provide varying levels of assistance at different operating conditions. For example, greater assistance may be provided at operating conditions where the benefit of the assistance (e.g., on reduced emissions, increased fuel economy, increased power, etc.) is higher, and less assistance may be provided at operating conditions where the benefit of the assistance is lower.

According to various exemplary embodiments, the amount of assistance provided and/or the operating conditions at which assistance is provided may be varied based on the power available to drive the motor and/or an expected driving range (e.g., a distance that the vehicle is expected to be driven between charges, such as for a plug-in hybrid vehicle). In some embodiments, the assistance may be configured based on the available power to drive the motor (e.g., the difference between a starting depth of discharge and a maximum depth of discharge for the energy storage device). In other embodiments, the assistance may be configured based alternatively or additionally on an expected driving range, which may be provided by a user of the vehicle. If the assistance is not configured to the available charge and/or expected driving distance, a user may drive the vehicle a shorter distance than expected or the energy storage device(s) may have more available energy than anticipated and charge may remain unused at the end of the driving cycle (e.g., less than the available amount of assistance may be provided). Alternatively, a user may drive the vehicle a longer distance than expected or the energy storage device(s) may have less available energy than anticipated and the charge may be depleted before the end of the driving cycle (e.g., the motor may be unavailable to assist the engine for at least a portion of the driving cycle). By configuring the assistance based on the available power and/or the expected driving range, the assistance may be tailored (e.g., optimized) to the expected conditions of the driving cycle and the assistance may be provided judiciously (e.g., such that the available assistance is largely utilized during the drive cycle and the motor is available to assist the engine for most of the drive cycle).

Figure 1A:
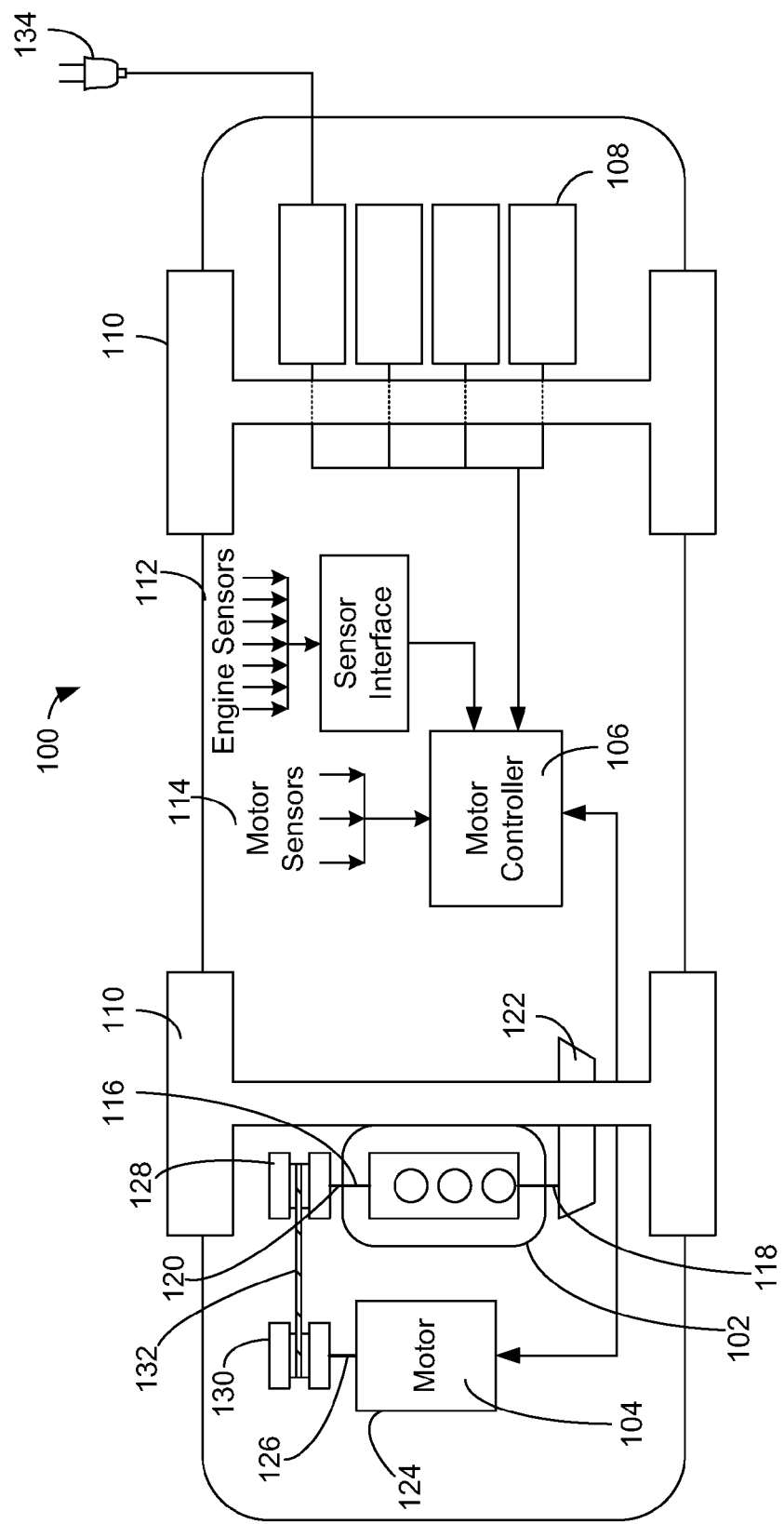
FIG. 1A is a schematic view of a hybrid power system for a vehicle according to an exemplary embodiment.

Referring now to FIG. 1A, a hybrid drive system 100 and components thereof are shown according to an exemplary embodiment. Hybrid drive system 100 is configured to be installed within a vehicle (e.g., automobiles such as cars, trucks, sport utility vehicles, minivans, buses, and the like; tri-pods, scooters, airplanes, boats, etc.), either by an original equipment manufacturer and/or by another entity as a retrofit application. Hybrid drive system 100 may selectively reduce the driving load of an engine and/or increase the torque capacity of an engine by assisting in the rotation of a crankshaft of the engine. The addition of hybrid drive system 100 to a vehicle is intended to improve fuel economy, emission rates and/or vehicle power in comparison to the same vehicle operating without hybrid drive system 100. Hybrid drive system 100 may be installed at any suitable location within a vehicle and integrated with any other vehicle components, and may be provided in a wide variety of sizes, shapes, and configurations, and installed using a wide variety of manufacturing and assembly processes according to various exemplary embodiments. All such variations are intended to be within the scope of the present disclosure.

FIG. 1A is a schematic illustration of hybrid drive system 100 according to an exemplary embodiment. Hybrid drive system 100 generally includes an internal combustion engine 102, an electric motor 104, a motor control unit 106, and a source of electrical power shown in FIG. 1 as a battery pack 108 including a number of energy storage devices in the form of electrochemical cells (although capacitive devices such as supercapacitors and/or ultracapacitors may be used in place of or in addition to the batteries according to other exemplary embodiments). Internal combustion engine 102 functions as a prime mover of the vehicle by generating a torque output that is sufficient to drive one or more wheels 110 of the vehicle. Electric motor 104 is provided to assist internal combustion engine 102 by reducing the driving load of internal combustion engine 102 and/or by augmenting the power of internal combustion engine 102. Electric motor 104 is powered by battery pack 108 and controlled by motor control unit 106.

In addition to assisting internal combustion engine 102 by reducing the driving load of internal combustion engine 102 and/or by augmenting the power of internal combustion engine 102, electric motor 104 may also be configured to function as a generator for charging battery pack 108 and/or for supplying electric energy to various electrical components within the vehicle. Electric motor 104 may be configured to function as a generator (e.g., provide a regeneration function) during one or more operating conditions of the vehicle, such as when the vehicle is coasting down a slope, during braking, when the vehicle is moving forward due to its accumulated momentum (e.g., without the need for driving power from internal combustion engine 102), and/or during other operating conditions. Electric motor 104 may further be configured to supply mechanical energy (e.g., rotational mechanical energy, etc.) for operating one or more systems within the vehicle. For example, as detailed below, electric motor 104 may be used to power a compressor that is part of an air conditioning system of the vehicle.

Still referring to FIG. 1A, internal combustion engine 102 includes an output shaft, shown as a crankshaft 116 having a first output 118 and a second output 120. First output 118 is configured to be coupled to a drive train of the vehicle for delivering power to one or more of wheels 110. According to the embodiment illustrated, the vehicle is a front wheel drive vehicle and the drive train includes a transmission 122 (either an automatic transmission or a manual transmission) coupled to the front wheels 110 via one or more axles, differentials, linkages, etc. According to the various alternative embodiments, hybrid drive system 100 may also be used on a rear-wheel drive vehicle and/or an all-wheel drive vehicle. Internal combustion engine 102 delivers rotational mechanical energy to the drive wheels through transmission 122 by rotating crankshaft 116.

Electric motor 104 is coupled in parallel with internal combustion engine 102 to assist internal combustion engine 102 in supplying the rotational mechanical energy to transmission 122. According to the embodiment illustrated, electric motor 104 is coupled to second output 120 of crankshaft 116; second output 120 being provided at an end of crankshaft 116 that is opposite first output 118 such that electric motor 104 is coupled to an end of crankshaft 116 that is opposite the end which is coupled to transmission 122. Coupling electric motor 104 at such a position relative to internal combustion engine 102, rather than on the same side as transmission 122, may simplify the addition of hybrid drive system 100, particularly in retro-fit applications. Further, positioning electric motor 104 before transmission 122 allows electric motor 104 to take advantage of the gearing of transmission 122 to reduce the load on electric motor 104. For example, for a vehicle having a 5-speed manual transmission, the gear ratios may vary between approximately 3.45 and approximately 0.8 as the gear position is changed from first gear to fifth gear. Thus, for the given example, coupling electric motor 104 to crankshaft 116 before transmission 122 would advantageously allow electric motor 104 to provide an output torque in first gear that is 3.45 times greater than if the same electric motor 104 was coupled to crankshaft 116 after transmission 122. As such, the system allows a smaller electric motor 104 to be used to meet the torque demand of a particular application than if electric motor 104 was coupled to crankshaft 116 after transmission 116.

Electric motor 104 assists internal combustion engine 102 by assisting in the rotation of crankshaft 116 and thereby reducing the driving load of internal combustion engine 102 and/or augmenting the power of internal combustion engine 102. Because the driving load of internal combustion engine 102 can be reduced, the fuel consumption and/or the emission rates can be improved. The amount of assistance provided by electric motor 104, and/or the time period at which assistance is provided by electric motor 104, may vary depending on the particular needs and/or parameters of the application in which hybrid drive system 100 is being used. The assistance of electric motor 104 may help move the operation of internal combustion engine 102 into a more efficient operating zone, resulting in lower emissions, increased fuel economy, etc.

Electric motor 104 generally includes a motor housing 124 and an output shaft 126. According to an exemplary embodiment, electric motor 104 is positioned relative to internal combustion engine 102 such that housing 124 is adjacent to a side of internal combustion engine 102, with output shaft 126 being substantially parallel to and offset from crankshaft 116. According to the embodiment shown, electric motor 104 is positioned forward of internal combustion engine 102 (relative to a driving direction of the vehicle) and is coupled to internal combustion engine 102 via a pulley system. The pulley system generally includes a first pulley 128 and a second pulley 130. First pulley 128 is rotatably coupled to second output 120 of crankshaft 116, while second pulley 130 is rotatably coupled to output shaft 124 of electric motor 104. A coupling device (e.g., chain, strap, etc.), shown as a belt 132, is provided between first pulley 128 and second pulley 130.

Figure 1B:
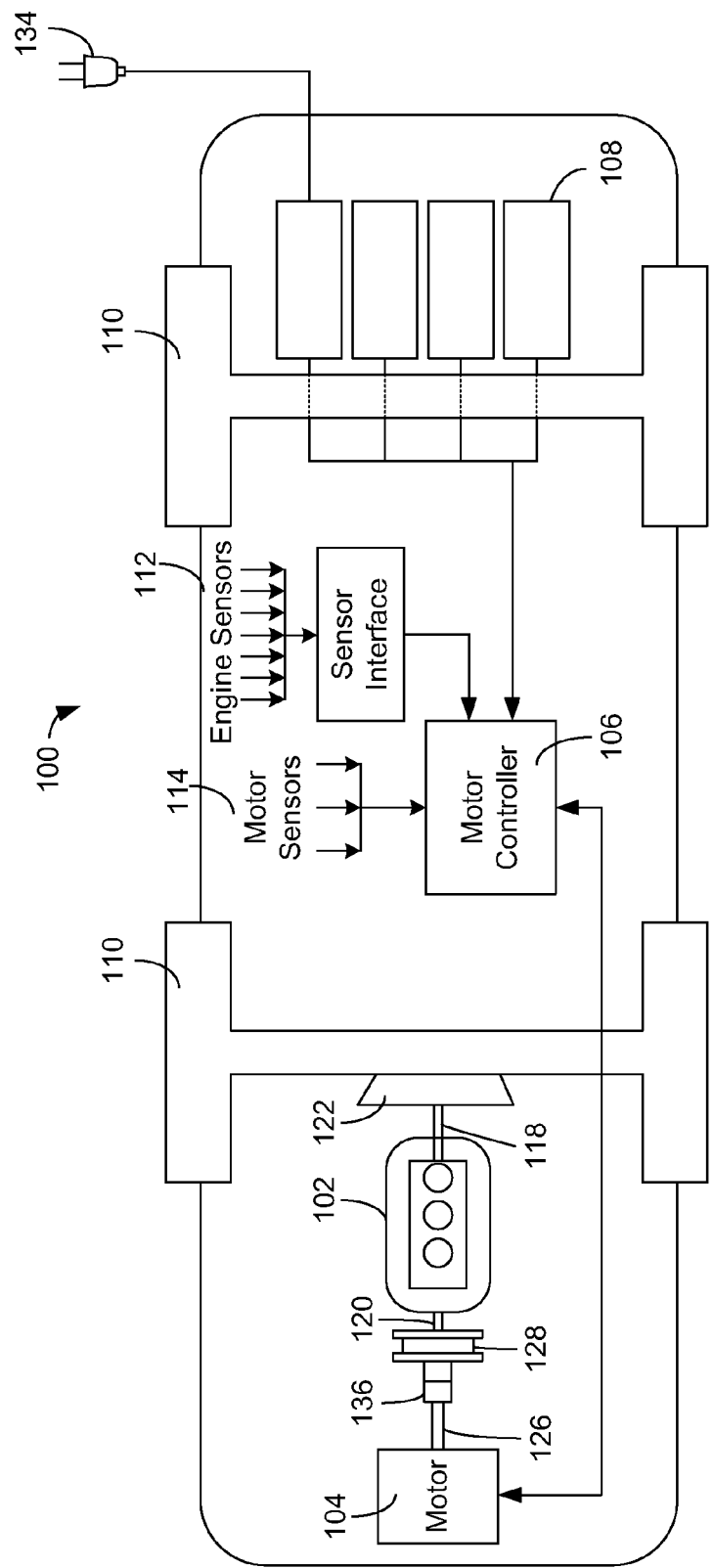
FIG. 1B is a schematic view of a hybrid power system for a vehicle according to another exemplary embodiment.

According to the various alternative embodiments, the pulley system may be replaced with any other suitable coupling system including, but not limited to, a system of gears. Referring to FIG. 1B, hybrid driver system 100 is shown according to another exemplary embodiment. According to the embodiment illustrated, electric motor 104 is positioned relative to internal combustion engine 102 such that an end of housing 124 is facing an end of internal combustion engine 102 and output shaft 126 is at least partially aligned (e.g., coaxial, concentric, etc.) with second output 120 of crankshaft 116. A shaft coupling (e.g., universal joint, collar, etc.), shown as a universal coupling 136, is provided between output shaft 126 and second output 120 to directly couple electric motor 104 to internal combustion engine 102. Universal coupling 136 is configured to compensate for any slight misalignment between output shaft 126 and second output 120. According to the embodiment illustrated, universal coupling 136 is mounted to first pulley 128, which is rotatably supported by internal combustion engine 102. Similar to the embodiment detailed above with respect to FIG. 1A, first pulley 128 may support a belt coupled to at least one of an alternator and a compressor of an air conditioning system.

Figure 2A:
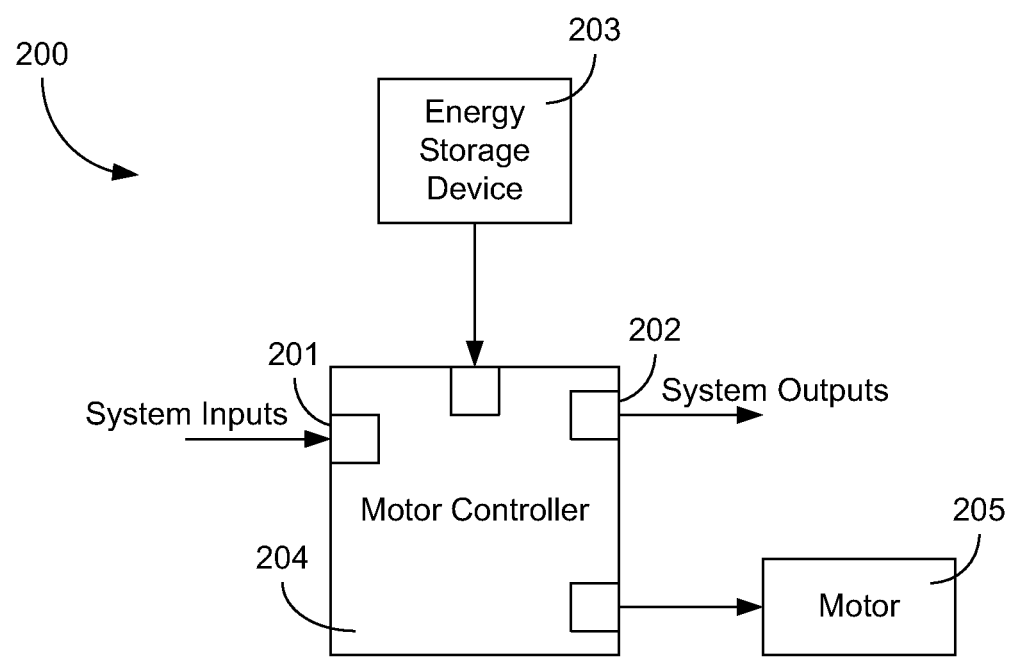
FIG. 2A is a block diagram of a motor control system according to an exemplary embodiment.

Referring now to FIG. 2A, a block diagram of a motor control system 200 for a hybrid vehicle is shown according to an exemplary embodiment. Motor control system 200 includes a motor controller 204 configured to generate and/or provide one or more control signals for an electric motor 205 similar to that described above in conjunction with hybrid drive system 100. Motor controller 204 may include one or more processors (e.g., microcontrollers) and one or more computer-readable media (e.g., memory) configured to store various data utilized by motor control system 200 and/or instructions that may be executed by the processor(s) to perform various functions. A memory of motor controller 204 may include a motor control module that generates the control signals for controlling motor 205. In some embodiments, the motor control module may generate the control signals based on one or more motor assistance profiles such as those discussed in greater detail with respect to FIGS. 3 and 4. Motor controller 204 may also be configured to manage energy provided by an energy storage device 203 (e.g., battery, capacitor, array of batteries and/or capacitors, etc.). In various embodiments, energy storage device 203 may include one or more lead acid batteries, lithium-ion batteries, nickel-metal-hydride batteries, supercapacitors, and/or other types of energy storage devices.

Motor controller 204 may receive one or more vehicle inputs 201 (e.g., brake, clutch, vehicle speed, rotational speed, temperature, etc.) from various sensors, circuits and/or other components of the vehicle. In some embodiments, motor controller 204 may be configured to generate control signals for the motor and/or manage the use of energy from energy storage device 203 based on one or more of vehicle inputs 201. Motor controller 204 may be configured to generate one or more system outputs 202. In various embodiments, system outputs 202 may include a motor controller power output to toggle power to the motor controller, a fault lamp output to indicate a fault, display outputs to display various information about motor controller system 200 (e.g., to a driver of the vehicle, mechanic, etc.), and/or other types of outputs.

Figure 2B:
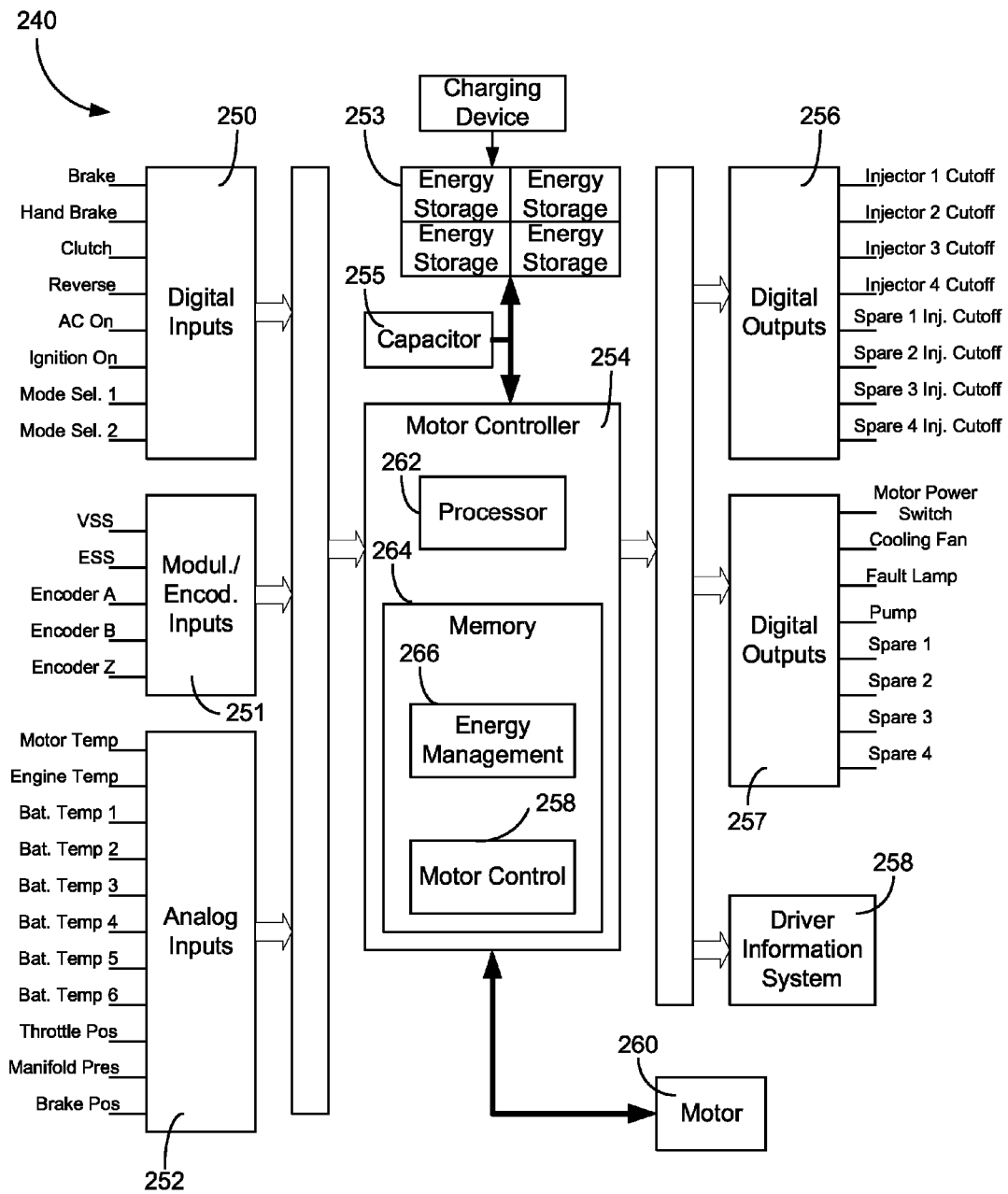
FIG. 2B is a more detailed block diagram of a motor control system according to an exemplary embodiment.

Referring now to FIG. 2B, a more detailed block diagram of one possible motor control system 240 is shown according to an exemplary embodiment. Motor control system 240 includes a motor controller 254 (e.g., a proportional-integral-derivative, or PID, controller). Motor controller 254 includes one or more processors 262 and a memory 264. Memory 264 may include one or more modules (e.g., software modules). The modules stored in memory 264 may include a motor control module 268 configured to generate one or more control signals to control the operation of a motor 260 (e.g., poly-phase motor, single phase motor, AC motor, DC motor, induction motor, etc.). Motor 260 may be coupled to an engine of the vehicle (e.g., by a universal coupling or a belt) and configured to provide assistance to the engine. In some embodiments, motor control module 268 may generate the control signals based on one or more motor assistance profiles such as those discussed in greater detail with respect to FIGS. 3 and 4.

The modules may also include an energy management module 266 configured to manage energy provided by one or more energy storage devices 253. Energy storage devices 253 may include batteries, capacitors, and/or other types of storage devices. In some embodiments, energy storage devices 253 may be electrically coupled to a capacitor 255 configured to temporarily store charge (e.g., such as energy regenerated by the vehicle during downhill coasting, braking, etc.). Energy storage devices 253 may also be connected to a charging device (e.g., for a plug-in hybrid). Energy management module 266 may be configured to determine the amount of available charge remaining in energy storage devices 253. In some embodiments, energy management module 266, alone or in combination with motor control module 268, may be configured to change the control signals provided to motor 260 based on the available charge in energy storage devices 253 and/or other vehicle operating conditions.

Motor controller 254 may be configured to receive various inputs from the engine, energy storage devices 253, and/or other components of the vehicle. The inputs may include digital inputs 250 (e.g., brake, hand brake, clutch, reverse, air conditioning, ignition, mode selection, such as economy or power, etc.), modulated and/or encoded inputs 251 (e.g., vehicle speed sensor, engine speed sensor, encoders, etc.), analog inputs 252 (e.g., motor temperature, engine temperature, temperature for energy storage device(s), throttle position, manifold pressure, brake position, etc.), and/or other types of inputs. In some embodiments, inputs 250, 251, and/or 252 may be isolated through isolator circuitry (e.g., galvanic isolators). Information received at inputs 250, 251, and/or 252 may be received from various vehicle sensors (e.g., existing vehicle sensors, sensors added to vehicle for use by motor control system 240, etc.). In some embodiments, inputs 250, 251, and/or 252 may be received from a communication link between two or more microcontrollers (e.g., engine control or vehicle control modules), such as by tapping into the link between two controllers. In such embodiments, links between controllers may be configured to be controller area network bus ("CAN-bus") links or links according to another suitable protocol for communication between two controllers in a vehicle.

Motor controller 254 may also be configured to generate one or more outputs (e.g., digital outputs, analog outputs, etc.) such as injector outputs 256 and/or system outputs 257. Injector outputs 256 are configured to control fuel injectors (e.g., through one or more controllers) to delay and/or limit the flow of fuel to the engine. In some embodiments, motor controller 254 may be configured to control the fuel injectors without modifying an engine control unit and/or engine management system. System outputs 257 may include a power supply control output, motor controller cooling fan output, fault lamp output, pump output, and/or other types of outputs used to provide information to and/or control various components of the vehicle. Motor controller 254 may also be configured to generate display information 258 for display to a driver of the vehicle (e.g., on a display on or near the dashboard of the vehicle).

Figure 3A:
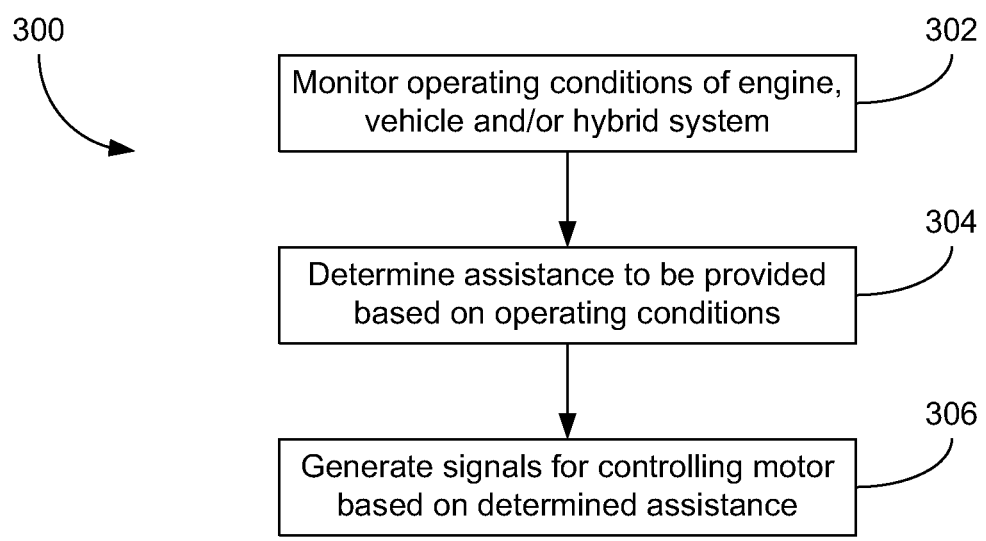
FIG. 3A is a flow diagram of a process for controlling a motor to provide assistance to an engine according to an exemplary embodiment.

Referring now to FIG. 3A, a flow diagram of a process 300 for controlling a motor (e.g., motor 104 shown in FIGS. 1A and 1B) to provide assistance to an engine (e.g., internal combustion engine 102 shown in FIGS. 1A and 1B) is shown according to an exemplary embodiment. Process 300 may be used to selectively control and/or operate the motor to provide assistance to the engine at one or more predetermined operating conditions of the engine, vehicle and/or hybrid system (e.g., motor, energy storage device(s), etc.).

At step 302, process 300 monitors one or more operating conditions of the engine, vehicle and/or hybrid system. A motor controller may monitor operating conditions such as linear speed, rotational speed (RPM), engine load, acceleration and/or acceleration demand, etc. The motor controller may receive inputs from one or more sensors for use in monitoring operating conditions of the engine, such as a vehicle speed sensor, an engine speed (e.g., rotational speed) sensor, a throttle position, a gear position, etc. The motor controller may be configured to determine (e.g., continuously, periodically, etc.) one or more sets of operating conditions for use in determining the assistance to be provided by the motor.

At step 304, the assistance to be provided by the motor is selectively determined based on the operating conditions monitored at step 302. The assistance may be determined according to a motor assistance profile that defines the level of assistance that should be provided at various operating conditions. In one embodiment, the motor assistance profile may be a lookup table (e.g., stored in a memory associated with the motor controller) having data representing the level of assistance that should be provided at different linear speeds and rotational speeds. For a set of operating conditions observed by the motor controller at step 302, the motor controller may be configured to look up the assistance that should be provided by the motor, if any, in the motor assistance profile. The assistance to be provided by the motor may then be set based on the value contained in the motor assistance profile that most closely corresponds with the observed operating conditions. For example, the motor assistance profile may include a value indicating that the motor should provide a low level of assistance (e.g., a motor output torque of ten percent of the peak torque) at a speed of 20 km/h and an RPM of 3,200 RPM. In another example, the motor assistance profile may indicate that the motor should provide a higher level of assistance (e.g., a motor output torque of 90 percent of the peak torque) at a speed of 50 km/h and an RPM of 1,300 RPM. In various embodiments, the assistance levels reflected in the motor assistance profile may be based on other operating conditions, such as demand for acceleration, engine load, gear position, etc.

At step 306, signals are generated to control the operation of the motor (e.g., the assistance provided by the motor) based on the assistance level determined at step 304. The signals may be generated based on the value obtained from the motor assistance profile for the operating conditions observed at step 302. The generated signals may then be sent to the motor to control the motor's operation and/or the assistance provided by the motor to the engine.

In some embodiments, for at least some operating conditions (e.g., when the operating conditions indicate a demand for acceleration) the motor may be operated at a higher current (e.g., a peak current) or higher torque (e.g., a peak torque) than the continuous operating rating for the motor during such operating conditions (e.g., indicating a rapid increase in emissions and/or power demand or acceleration) for a short time or pulse. In some embodiments, the higher current and/or torque at which the motor may be operated to provide assistance during such conditions may be three to four times the continuous rating of the motor. For example, in one embodiment, a motor having a continuous current rating of 50 amps ("A") may be pulsed at a current level of 180 A or at some other (e.g. predetermined) value above the continuous 50 A rating of the motor. In another example, a motor having a continuous torque rating of 30 Newton-meters ("N-m") may be pulsed at a torque level of 40 N-m or at some other value above the continuous 20 N-m rating of the motor. By operating the motor at a high current and/or torque in the form of short pulses, a small motor may be utilized (e.g., providing cost savings, easier integration of the motor with existing components, etc.) without substantially damaging the motor during operation at higher current and/or torque levels than the motor's continuous rating. Exemplary embodiments in which the motor may be operated at a current and/or torque that is higher than its rated continuous values are discussed in further detail with reference to FIG. 3B.

Figure 3B:
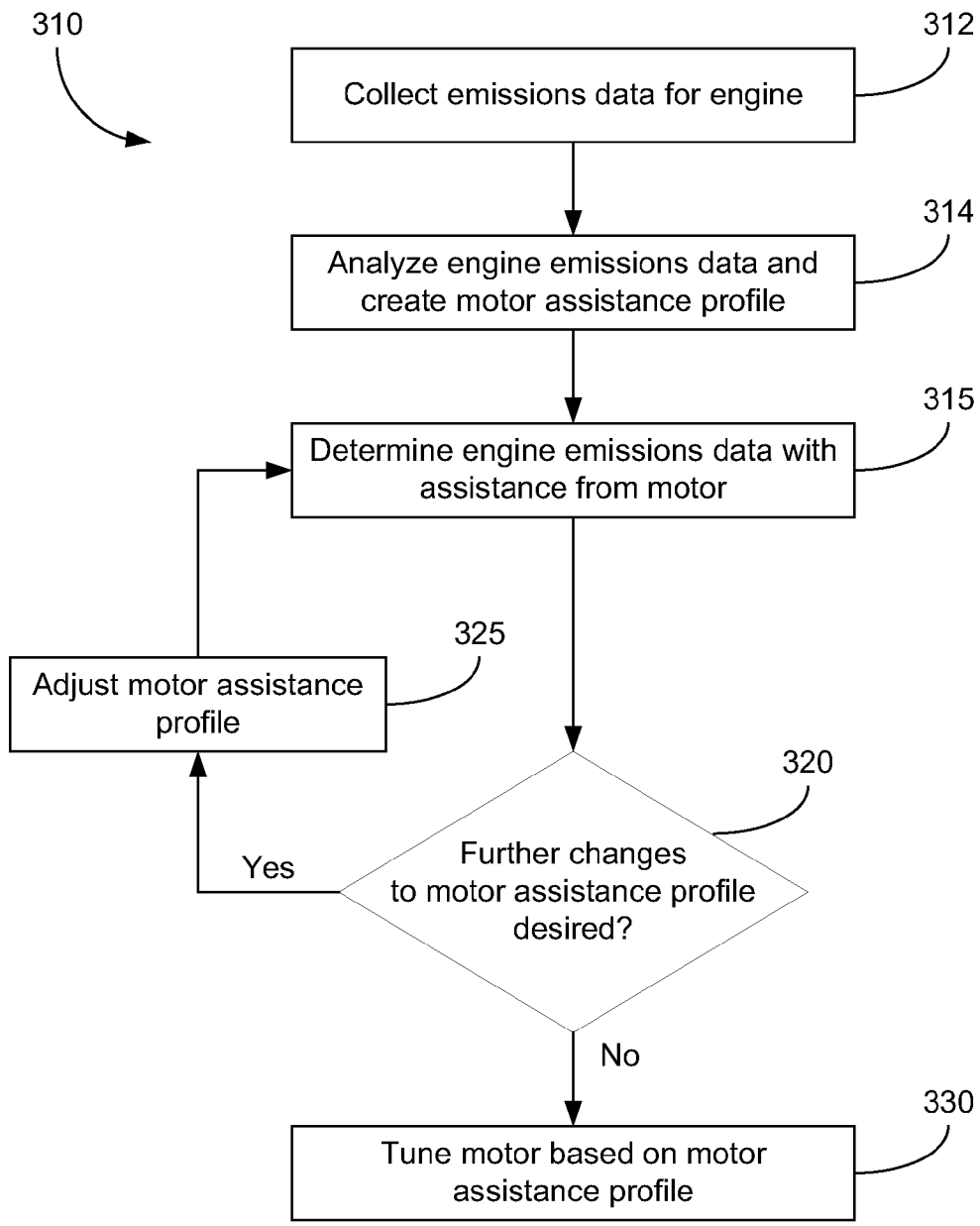
FIG. 3B is a flow diagram of a process for determining the assistance provided to an engine by a motor according to an exemplary embodiment.

Referring now to FIG. 3B, a flow diagram of a process 310 for determining the assistance to be provided to an engine (e.g., internal combustion engine 102 shown in FIGS. 1A and 1B) by an electric motor (e.g., motor 104 shown in FIGS. 1A and 1B) is shown according to an exemplary embodiment. Process 310 may be used to determine a motor assistance profile that defines how the motor will assist the engine under different driving conditions (e.g., the amount of assistance that will be provided at different linear and/or rotational speeds). The motor may be tuned to provide selective assistance to the engine based on the determined motor assistance profile. In some embodiments, use of the motor to assist the engine (e.g., based on the motor assistance profile) may allow the engine to operate more efficiently and/or may provide for reduced vehicle emissions, reduced fuel consumption (i.e., increased fuel economy), increased vehicle power, and/or other benefits.

At step 312 of process 310, emissions data is determined (e.g., collected or received) for an engine of interest across a range of operating conditions to characterize the engine. The emissions data may include data relating to carbon monoxide emissions, carbon dioxide emissions, hydrocarbon emissions, nitrogen oxide emissions, and/or other vehicle emissions. In some embodiments, other data (e.g., different than but related to emissions data, such as engine load, gear position, acceleration data, etc.) may be used to determine a motor assistance profile for the engine. Each type of engine (e.g., petrol, diesel, etc.) is associated with different emissions data (e.g., a different emissions profile or curve). For example, the engine of a small hatchback car would likely result in different emissions data than the engine of a large truck. Different emissions data or emissions profiles may be determined for each type of engine for which the hybrid system is utilized.

In one embodiment, the emissions data may be collected based on emissions testing of the engine of interest. For example, one or more sample engines of a particular type (e.g., an engine used in a particular car or line of cars) may be tested for emissions. In one embodiment, emissions may be tested by running the engine on a device (e.g., a dynamometer) configured to measure linear speed and/or rotational speed (e.g., revolutions per minute ("RPM")) while measuring emission levels (e.g., at the vehicle's tailpipe) using an exhaust gas analyzer or other emissions measurement device. Linear speed and rotational speed are referred to herein as speed and RPM, respectively, but it should be appreciated that other measures of linear and/or rotational speed may be used in various embodiments.

Emissions data may be collected based on the test or tests. In one embodiment, the emissions data may be configured to reflect a relationship between at least two of linear speed, rotational speed, and engine emissions. In embodiments in which multiple sample engines are tested, the emissions data may be collected and/or calculated based on a selection of the most desirable and/or accurate result or results or a combination of the results (e.g., the average of the results, the standard deviation of the results, etc.). In one embodiment, a motor assistance profile created based on the emissions data may be used for multiple or all engines of the type tested (e.g., all types or lines of cars utilizing the tested engine). Determining emissions data for an engine based on test measurements may reduce or eliminate the need for the individual or entity creating the motor assistance profile to have access to predetermined emissions data for the engine and/or vehicle (e.g., to create the motor assistance profile in a "black box" environment). In other exemplary embodiments, predetermined emissions data may be provided for the engine and/or vehicle (e.g., by the engine and/or vehicle manufacturer) and the provided emissions data may be used to create a motor assistance profile.

Figure 3C:
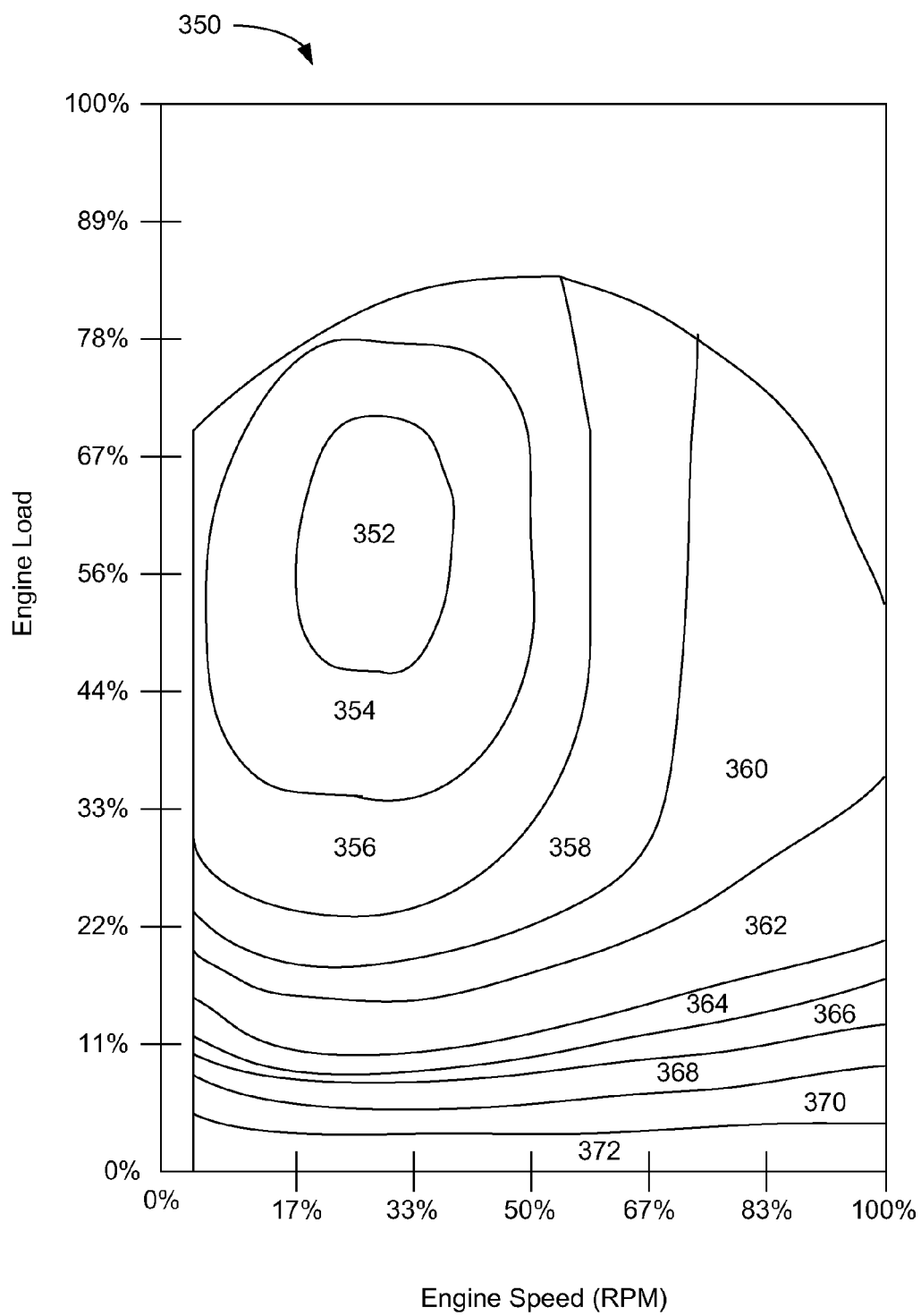
FIG. 3C is a contour graph of the efficiency of a sample engine under varying operating conditions according to an exemplary embodiment.

Once emissions data has been obtained for the engine of interest, the emissions data is analyzed and a motor assistance profile is created based on the analysis of the emissions data (step 314). The motor assistance profile may be designed to direct the motor to assist the engine in a manner that improves the efficiency of the engine and reduces emissions. Referring to FIG. 3C, a contour graph 350 is shown illustrating the efficiency of a particular engine according to an exemplary embodiment. The x-axis of graph 350 represents rotational speed in percentage increments between a minimum RPM and a maximum RPM. The y-axis of graph 350 represents the load on the engine (e.g., in manifold absolute pressure, or MAP) in percentage increments between a minimum load and a maximum load. Graph 350 includes a plurality of zones 352 through 370 in which the engine operates under various levels of efficiency. The engine operates most efficiently when it is run in zone 352, which corresponds to a relatively high load and relatively low RPM. Engine load as shown in graph 350 is related to vehicle speed; generally, as the vehicle speed increases, the load on the engine increases. The efficiency of the engine decreases sequentially as the engine is operated in each zone outside of zone 352. For example, the second most efficient zone of operation is zone 354, which is immediately adjacent to zone 352 in graph 350. The third most efficient zone of operation is zone 356, the fourth most efficient zone is zone 358, the fifth most efficient zone is zone 360, and so on. The least efficient zone (e.g., the zone where the engine emits the greatest emission levels and consumes the most fuel) is zone 372. In some embodiments, process 310 may utilize the motor assistance profile to provide assistance to the engine and shift the operation away from a less efficient zone to a more efficient zone.

Figure 3D:
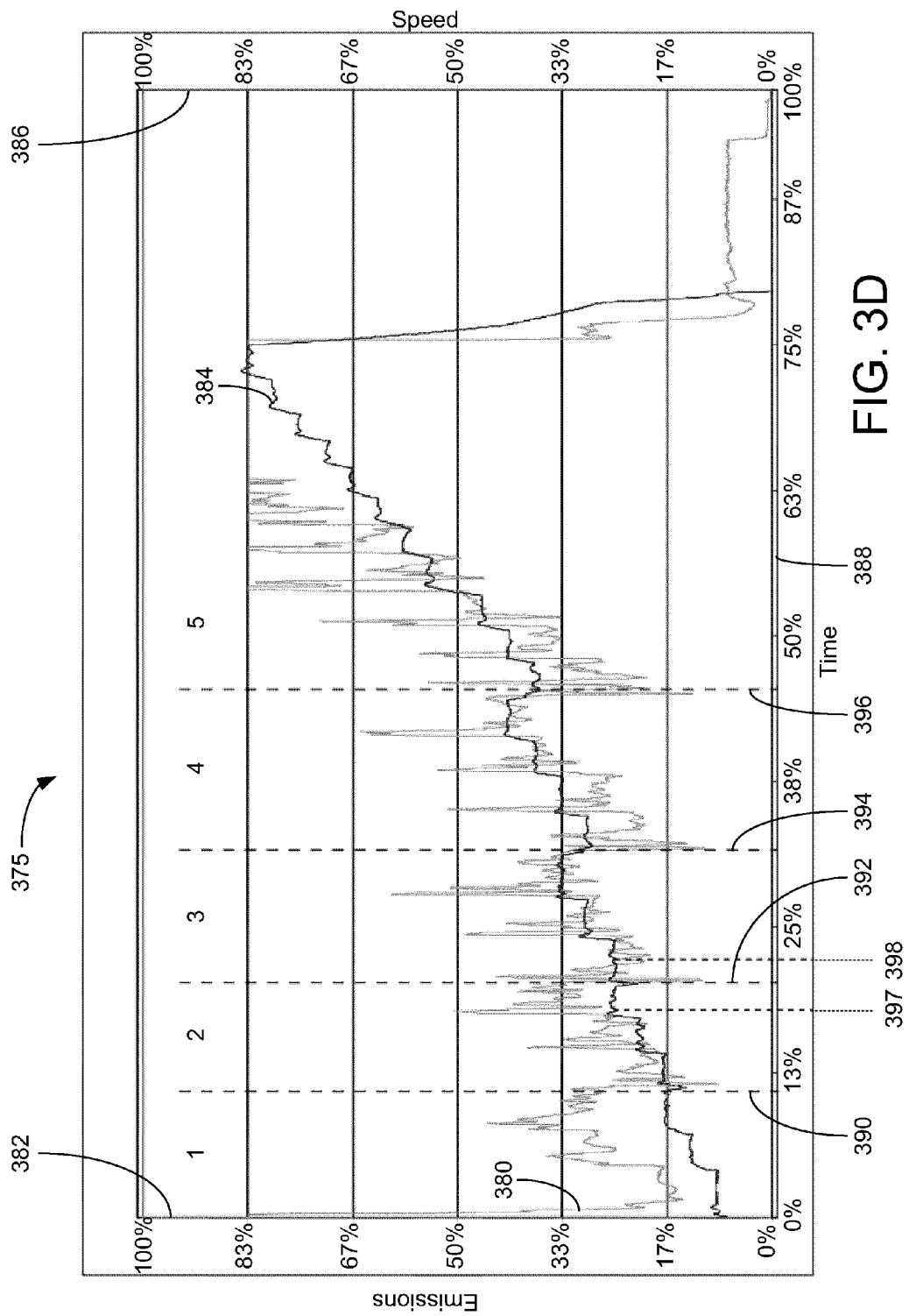
FIG. 3D is a graphical representation of emissions data resulting from an emissions test according to an exemplary embodiment.

Referring now to FIG. 3D, a graph 375 illustrating emissions data for a sample engine or vehicle (e.g., obtained at step 312 of the exemplary embodiment of FIG. 3B) is shown according to an exemplary embodiment. Graph 375 includes an emissions curve 380 representing the determined emissions with reference to an emissions axis 382. Emissions axis 382 represents emissions in percentage points between a minimum emissions level (e.g., in parts per million) and a maximum emissions level. The emissions reflected in emissions curve 380 in the illustrated exemplary embodiment are carbon monoxide emissions. In other exemplary embodiments, the emissions may be carbon dioxide emissions, hydrocarbon emissions, nitrous oxide emissions, or other types of emissions. Graph 375 also includes a speed (e.g., linear speed) curve 384 representing the speed of the vehicle with reference to speed axis 386. Speed axis 386 represents linear speed in percentage points between a minimum speed (e.g., in kilometers per hour ("km/h")) and a maximum speed. Graph 375 further includes a time axis 388 representing the time over which the test is conducted. Time axis 388 represents time in percentage points from a test start time (e.g., in seconds) to a test end time. In the illustrated exemplary embodiment, the vehicle was progressed through its gear range from a low to a high speed in increments. For each gear, the vehicle was run at a low speed for the gear and the speed was increased (e.g., in fixed or variable increments) until a high speed for the gear was reached, at which point the vehicle was shifted into the next highest gear. This process was repeated for five gears. Point 390 on time axis 388 reflects the time at which the vehicle was shifted from first to second gear, point 392 reflects the shift from second to third gear, point 394 reflects the shift from third to fourth gear, and point 396 reflects the shift from fourth to fifth gear. In various exemplary embodiments, other tests or variations to the illustrated test may be utilized to obtain emissions data.

Referring again to FIG. 3B, the determination of the engine operating conditions at which assistance from the motor should be provided and/or the level or amount of assistance provided is made based upon the emissions data, and a motor assistance profile is created based on the determination (step 314). Assistance may be provided over one or more ranges of operating conditions (e.g., ranges of linear and rotational speeds) of the engine. The level of assistance may vary between the one or more ranges and/or within a single range. For example, it may be determined that assistance should be provided in a speed range from 20 km/h to 90 km/h and/or an RPM range from 1,000 RPM to 3,700 RPM, but that more assistance should be provided in a lower sub-range of RPM for a particular speed (e.g., for a higher gear) than a higher sub-range of RPM for that speed (e.g., for a lower gear).

For further example, for the exemplary engine reflected in graph 375 of FIG. 3D, it may be determined that greater assistance should be provided at point 398, where the RPM is lower, than point 397, where the RPM is higher. At higher speeds, lower gears operate at a higher RPM than higher gears operate at the same speed. For example, immediately prior to point 392, at point 397, the engine operates at a higher RPM in second gear than it operates immediately after point 392, at point 398, at the same speed in third gear. Providing greater assistance at point 398 may have a greater effect on the efficiency of the engine than providing greater assistance at point 397; because the RPM is lower at the same speed at point 398 than at point 397, the emissions are higher (as reflected in emissions curve 380).

Providing assistance to the engine from the motor allows the engine to achieve the desired speed and/or acceleration while operating at a lower RPM than would be possible if the engine were the sole component providing driving power to the vehicle. Referring, for example, to graph 350 of FIG. 3C, providing assistance (e.g., at points 397 and/or 398 in graph 375 of FIG. 3D) may shift the operation of an engine from a less efficient zone (e.g., zone 368) to a more efficient zone (e.g., zone 362).

In some embodiments, some assistance may be provided by the motor over the full range of engine operating conditions but the extent (e.g., amount) of the assistance may be varied based on the operating conditions. Once the appropriate range and/or levels of assistance have been determined, a motor assistance profile is generated reflecting the determined assistance that should be provided by the motor. The motor assistance profile may be stored in a memory associated with the motor and/or motor controller and may be utilized (e.g., by a motor control algorithm) to determine the operating conditions under which the motor should provide assistance and the level of assistance.

In some embodiments, greater assistance may be provided to the engine during operating conditions where a rapid increase in power is demanded (e.g., where the emissions data indicates temporarily high emissions or spikes in emissions), such as during acceleration. Inspection of graph 375 of FIG. 3D indicates spikes in emissions curve 380 where the vehicle accelerates (e.g., rapidly) from a lower speed to a higher speed (as reflected in speed curve 384). At these operating conditions, greater assistance may be provided from the motor to counteract the temporary increases in emissions reflected in emissions curve 380 (e.g., such that the temporary increases are smaller or have a smaller amplitude than without motor assistance), provide greater power, etc.

In some embodiments, the motor may be operated at a higher current (e.g., a peak current) or higher torque (e.g., a peak torque) than the continuous operating rating for the motor during such operating conditions for a short time or pulse (e.g., as discussed with respect to FIG. 3A). According to various embodiments, the duration and/or amplitude of the pulse may be dependent upon the engine load demand (e.g., acceleration) and/or emissions data. For example, if the emissions data indicates a greater or more prolonged spike in emissions, the pulse applied may be greater in amplitude or size and/or duration than for a smaller or shorter spike in emissions. In some embodiments, a pulse may be applied only if the rate of change of power demanded exceeds a certain level (e.g., if the acceleration exceeds a certain threshold). In other embodiments, a pulse may be applied whenever the vehicle is called upon to accelerate and/or the amplitude and/or duration of the pulse may be dependent upon the rate of change of power demand (e.g., acceleration).

In various embodiments, the motor controller may be configured to limit the duration and/or amplitude of a pulse to protect against damage to the motor. In some embodiments, the amplitude of the pulse may be limited so that the current and/or torque provided to the motor does not exceed a recommended peak current and/or torque for the motor (e.g., two to five times the continuous current rating of the motor). In other embodiments, the duration of the pulse (e.g., the amount of time the current and/or torque is greater than the continuous rating) may be limited by the temperature of the motor. For example, the motor controller may be configured to shorten the duration of a pulse or cut off a pulse if a motor temperature input indicates that the motor is approaching a temperature threshold (e.g., a temperature at which the motor may be damaged).

In further embodiments, the determination of the assistance to provide at various engine operating conditions may be based on the frequency with which a vehicle is expected to be driven within one or more ranges of operating conditions. For example, vehicles may be driven fairly infrequently at a low speed such as less than 20 km/h (e.g., because very few roads have a speed limit of lower than 20 km/h and drivers tend to accelerate the vehicle fairly quickly to a normal driving speed). It may be determined that little or no assistance may be provided at speeds within this low speed range. In another embodiment, it may be determined that little or no assistance is to be provided at operating conditions where the speed is within this low range and the RPM is within a high range (e.g., 2,500 RPM or higher), but greater assistance may be provided at operating conditions where the speed is within this low range and the RPM is within a low range (e.g., 1,000 RPM to 2,500 RPM).

Vehicles may be driven with relatively high frequency in a middle range of speeds (e.g., 20 km/h to 80 km/h), such as those speeds at which the vehicle is normally operated in second through fourth or fifth gears (e.g., in the lower range of fifth gear). For example, many roads may have posted speed limits within this middle range of speeds. In some embodiments, the motor may be configured to provide greater assistance to the engine in this middle range of speeds. In further embodiments, the motor may be configured to provide a higher level of assistance within this middle range of speeds under those operating conditions where the RPM is higher than under conditions where the RPM is lower (e.g., to provide a greater impact on the emissions of the engine and/or move the engine during those conditions into a more efficient zone of operation).

In still further embodiments, the determination of the assistance to provide may be based at least in part on the battery power available to the motor and/or a desire to conserve battery power so the charge of the battery is not depleted too quickly. In some embodiments, the determination of the assistance may balance efficiency of the engine and/or reduction of emissions with the time and/or distance a charge is available in the battery or batteries. For example, emissions may be very high for operating conditions where the speed is at a very high range (e.g., above 90 km/h), but little assistance may be provided at such conditions because providing assistance may drain the battery quickly. In some embodiments, assistance may be gradually removed as the speed increases within the higher range of speeds.

In some embodiments, the motor assistance may be defined such that the motor provides additional torque to allow the vehicle to be operated at a low RPM as speeds decrease (e.g., allows the vehicle to decrease speed without shifting to a lower gear). Under normal operation (e.g., without assistance from the motor), the engine may not be able to operate at a low speed (e.g., 10 km/h) while in a higher gear (e.g., fourth gear). Motor assistance may be provided as the vehicle speed is decreased to allow the user to remain in the same gear (e.g., such that the user does not need to downshift to avoid stalling the engine). This may allow the engine to operate (e.g., consistently) at a lower RPM at lower speeds rather than proceed through one or more additional gears where the engine may operate at a higher RPM.

Once the motor assistance profile has been created, the motor assistance profile may be implemented in the hybrid system (e.g., in connection with the motor controller) and emissions data for the engine with assistance from the motor over a range of operating conditions (e.g., speed and RPM) may be determined (step 315). In some embodiments, the test (e.g., range of operating parameters, test equipment, etc.) used to determine the emissions in step 315 may be substantially similar to the test utilized to determine emissions in 312 for consistency.

The emissions data determined in step 315 may be inspected and/or analyzed to determine whether further changes to the motor assistance profile are desired (step 320). Further changes may be implemented if a greater reduction in emissions than reflected in the emissions data determined in step 315 for one or more ranges of operating conditions is desired. Changes may also be desired if the emissions data determined in step 315 reflects a greater reduction in emissions for one or more ranges of operating conditions than desired and a reduction in motor assistance may be implemented to converse battery power. If further changes to the motor assistance profile are desired, the motor assistance profile may be adjusted to implement the desired changes (step 325) and process 310 may proceed to step 315 and re-determine emissions data for the engine with assistance provided by the motor as defined in the adjusted motor assistance profile. If further changes to the motor assistance profile are not desired, the hybrid system (e.g., motor and/or motor controller) is tuned and/or configured based on the motor assistance profile (step 330).

Various steps of the exemplary embodiment shown in FIG. 3B are described as being performed based on emissions data. In other exemplary embodiments, however, similar steps (e.g., analyzing data and creating a motor assistance profile) may be based on other types of data or vehicle information. For example, in one embodiment, a motor assistance profile may be created and/or assistance may be varied based on engine load data (e.g., such that greater assistance may be provided at operating conditions for which there is a higher load on the engine and lesser assistance may be provided at operating conditions for which there is a lower load on the engine). In another embodiment, a motor assistance profile may be created and/or assistance may be varied based on a gear position (e.g., first gear, second gear, third gear, etc., such that greater assistance is provided in some gears than in others). In still further embodiments, a motor assistance profile may be created and/or assistance may be varied based on acceleration data and/or an accelerator (e.g., gas pedal) position.

Figure 4A:
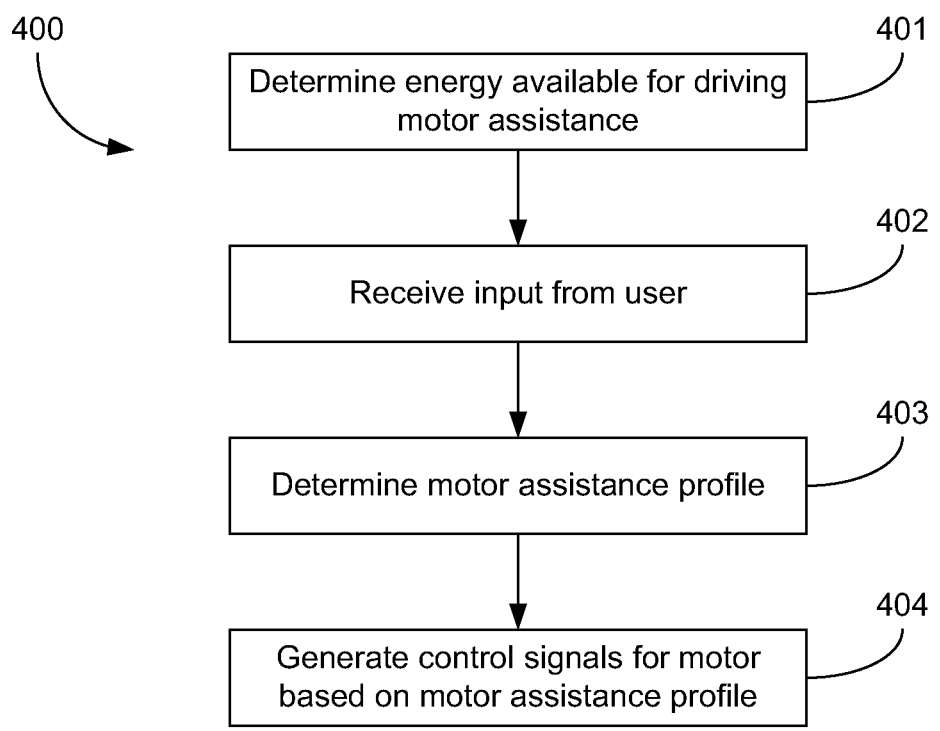
FIG. 4A is a flow diagram of a process for determining the assistance provided to an engine by a motor based on user input according to an exemplary embodiment.

Referring now to FIG. 4A, a flow diagram for a process 400 for determining the assistance to be provided to an engine by a motor based on user input is shown according to an exemplary embodiment. A limited amount of power may be available from energy storage devices (e.g., batteries and/or capacitors) with which to drive the motor to provide assistance to the engine. For example, a plug-in hybrid may only be capable of traveling a limited distance between charge cycles in a hybrid mode (e.g., with motor assistance). The distance may be dependent upon the amount of assistance being provided by the motor. Although the hybrid system may be configured to regenerate power to the energy storage devices under certain conditions (e.g., coasting downhill, braking, etc.), the conditions under which power is regenerated may be restricted such that the vehicle may still be able to travel a limited distance before the available charge is depleted and the motor is no longer able to provide assistance to the engine.

Assistance may be provided based on a motor assistance profile (e.g., created according to a process such as process 300 described above) optimized to provide assistance over a particular approximate distance or according to a particular mode setting (e.g., an economy mode for providing better fuel economy and greater efficiency, a power mode for providing an increase in power, etc.). However, a driver of the vehicle may wish to operate the vehicle over different distances and/or under different modes at different times. Using process 400, a user of the vehicle can specify a driving range (e.g., distance) and/or mode and a motor assistance profile may be determined based on the user input and used to control the assistance provided by the motor. For example, the driver may specify a long driving range, and the motor assistance profile may be selected and/or customized to the long driving range such that the motor may provide assistance over most or all of the driving range and the available energy may not be depleted early in the trip. The driver may specify a short driving range, and the motor assistance profile may be selected and/or customized to the short driving range such that most or all of the available energy may be utilized and the motor may provide greater assistance over the driving range. Process 400 may help improve the efficiency of the hybrid system under varying driving ranges and improve the versatility of the hybrid system.

Under various embodiments, one or more steps of process 400 may be executed manually (e.g., by a human being) and/or may be implemented in a computer (e.g., via instructions that are stored within one or more computer-readable media (e.g., a memory) and are executable by one or more processors. For example, various steps of process 400 may be executed by a motor controller such as motor controller 204, described with respect to the exemplary embodiment of FIG. 2A, and/or motor controller 254, described with respect to the exemplary embodiment of FIG. 2B.

At step 401, process 400 (e.g., executed by a motor controller, such as motor controller 204 and/or 254) determines the amount of energy available to drive the motor and assist the engine. The motor controller may be configured to utilize one or more inputs (e.g. hybrid system inputs), such as a state of charge input for the energy storage device(s), to determine the available energy. In some embodiments, the available energy may not be equivalent to the total energy stored in the energy storage device(s). The hybrid system may be configured to disallow the energy storage device(s) from exceeding a certain maximum depth of discharge ("DOD") (e.g., 50% DOD, 60% DOD, 70% DOD, etc.), for example, to avoid damaging the energy storage device(s). The maximum depth of discharge may be determined based on characteristics of the energy storage device(s), motor, engine, vehicle, and/or other factors. The available charge may be determined based on the difference between a starting DOD and the maximum DOD. For example, if the maximum DOD for a battery is determined to be 60 percent of the total capacity of the battery, and the starting DOD at the beginning of the driving cycle is 10 percent, then the charge available for providing motor assistance over the course of the driving cycle may be determined to be 50 percent of the total capacity of the battery. In some embodiments, the determination of the maximum DOD and/or the available energy may be based on factors such as the battery temperature, battery age, motor size, and/or other factors.

Depth of discharge is a measure of how much of the storage capacity of an energy storage device has been depleted. In some embodiments, the available energy for providing assistance may be determined based on a state of charge ("SOC") of the energy storage device(s). The SOC of an energy storage device is inversely related to its DOD. The available energy may be determined based on the difference between a starting SOC and a determined minimum SOC for the energy storage device(s). For example, if the minimum SOC is 40 percent of the total capacity of a battery, and the starting SOC is 90 percent, then the charge available for providing motor assistance may be determined to be 50 percent of the capacity of the battery.

At step 402, the motor controller receives input from a user for use in determining a motor assistance profile. The user may provide input via an input device that includes one or more features that allow a user to select inputs (e.g., knobs, buttons, a touchscreen, etc.). The input device may be located within the vehicle (e.g., on or near a dashboard of the vehicle). In one embodiment, the user may input an expected driving range or distance. The input driving range may represent a range or distance the user expects to travel during the day and/or between charging cycles of the energy storage device (s). In one embodiment, a display may present the user with a plurality of range options (e.g., less than 20 kilometers ("km"), 20 km, 40 km, 60 km, 80 km, 100 km, greater than 100 km, etc.) from which the user may select a range. In another embodiment, the user may specify a range (e.g., type a number into a keypad or touchscreen representing the driving range).

In still further embodiments, the user may select one or more available modes to customize the assistance provided by the motor at various operating conditions. For example, the user may select an economy mode in which assistance is provided in a manner that increases fuel economy and efficiency. In another exemplary embodiment, the user may select a power mode in which assistance is provided in a manner that provides extra power (e.g., for acceleration). In other embodiments, the modes may be selected automatically based on inputs from sensors associated with the vehicle and/or hybrid system.

In some embodiments, the motor controller and/or another component of the hybrid system may include a memory (e.g., a non-volatile memory) in which user inputs may be stored for later use. For example, a user may input a particular driving range (e.g., a range that the user commonly drives during a weekday) and indicate that the driving range should be used as a default range. If the user does not input a driving range, the default range may be used to establish the assistance that the motor should provide to the engine. In other embodiments, the user may specify driving ranges for a group of dates and/or types of days and the driving ranges may be stored in the memory. For example, default values may be stored in the memory for a weekday and a weekend, each day of the week, each day of a month, etc. In various embodiments, the user interface may be configured to allow a user to override a default range and input a different range. Such an embodiment may be used, for example, if a user plans to drive a route and/or distance that the user does not normally drive (e.g., for a vacation).

At step 403, a motor assistance profile is determined based on the available energy determined at step 401 and/or the user input received at step 402. In one embodiment, a plurality of motor assistance profiles, each associated with a different available energy level, driving range, and/or mode, are stored in a memory (e.g., of the motor controller) and an appropriate motor assistance profile is selected from among the stored profiles. Each of the plurality of motor assistance profiles may be based on and/or optimized for a particular available energy level and/or driving range. Motor assistance profiles associated with a larger amount of available energy and/or shorter driving range may provide a greater level of assistance over the range of operating conditions than motor assistance profiles associated with a smaller amount of available energy and/or longer range. As the charge available to power the motor decreases and/or the range associated with the motor assistance profiles increases, assistance may be selectively reduced to prolong the available charge of the battery in such a manner that assistance is reduced in circumstances and/or for operating conditions that result in a lower reduction in benefit (e.g., emissions, fuel economy, etc.).

In some embodiments, each motor assistance profile may be based on one available energy level and one driving range. For example, one motor assistance profile may be associated with an available energy level of 60 percent of the capacity of the energy storage device and a driving range of 50 km. Another motor assistance profile may be associated with an available energy level of 40 percent of the capacity of the energy storage device and a driving range of 80 km. For each available energy level there may be several profiles, each relating to a different driving range. For each driving range there may be several profiles, each relating to a different available energy level. In various other embodiments, each motor assistance profile may be based on one or more of an available energy level, driving range, and/or mode and may be modified based on factors upon which the profile is not explicitly based. For example, in one embodiment, a motor assistance profile may be based on a driving range of 60 km and the assumption that the energy storage device is fully charged. If the energy storage device is not fully charged, the motor assistance profile may be modified (e.g., by decreasing or eliminating assistance at certain operating conditions).

The motor assistance profiles for each available energy level and/or driving range may be created and/or customized based on similar methods and/or considerations discussed with reference to the exemplary embodiment shown in FIG. 3A. In some embodiments, motor assistance profiles for higher driving ranges and/or lower available energy levels may be generated by reducing the assistance provided at one or more operating conditions as compared to motor assistance profiles having lower driving ranges and/or higher available energy levels. For example, the level of assistance provided at one or more operating conditions where the assistance may have a lower beneficial impact (e.g., on emissions and/or fuel economy) may be reduced. Further, motor assistance profiles for lower driving ranges and/or higher available energy levels may be generated by increasing the assistance provided at one or more operating conditions as compared to motor assistance profiles associated with higher driving ranges and/or lower available energy levels. For example, the level of assistance provided at one or more operating conditions where the assistance may have a higher beneficial impact may be increased.

In other embodiments, assistance may be provided at different operating conditions for different motor assistance profiles. For example, in some embodiments, motor assistance profiles for higher driving ranges and/or lower available energy levels may be generated by eliminating assistance at one or more operating conditions as compared to motor assistance profiles having lower driving ranges and/or higher available energy levels. For example, assistance may not be provided for one or more operating conditions where the assistance may have a lower beneficial impact (e.g., on emissions and/or fuel economy). Further, motor assistance profiles for lower driving ranges and/or higher available energy levels may be generated by providing assistance at one or more operating conditions at which assistance is not provided according to motor assistance profiles having lower driving ranges and/or higher available energy levels. For example, assistance may be added for one or more operating conditions where the assistance may have a higher beneficial impact.

Referring now to FIG. 4B, a motor assistance table 410 illustrating the average assistance that may be provided at different available energy levels and driving ranges for an exemplary set of motor assistance profiles is shown according to one exemplary embodiment. Table 410 includes four columns representing different expected driving ranges (e.g., 40 km, 60 km, 80 km, and 100 km) and four rows representing different available energy levels (e.g., represented as percentages of the total capacity of the energy storage device(s)). The values presented in the various cells of table 410 represent the average assistance provided over the driving cycle (e.g., the time in between charge cycles) for different driving ranges and available energy levels. In table 410, a driving range of 60 km and an available charge of 70 percent (e.g., representing a full charge) represent a base condition and the average assistance for other conditions is provided with reference to this base condition. For example, if the available energy is determined to be 70 percent and the driving range is set at 40 km, the average assistance provided over the driving cycle may be 120 percent, or 20 percent greater, than the average assistance provided for a driving range of 60 km. If the available energy is determined to be 55 percent and the driving range is set at 60 km, the average assistance provided may be 80 percent, or 20 percent lower, than the average assistance provided for an available energy level of 70 percent. Various other conditions may result in different average assistance levels as illustrated in table 410. Table 410 is presented to illustrate that the assistance provided by the motor may be varied based on the available energy level and/or the selected driving range and is only one example of how the assistance may vary under differing conditions. It should be appreciated that various exemplary embodiments may vary the operating conditions at which assistance is provided and/or the extent of assistance in various different ways. Further, it should be appreciated that the gradations between available energy levels, driving ranges, and/or assistance levels may differ in various exemplary embodiments. All such variations are intended to be within the scope of the present disclosure.

Figure 4C:
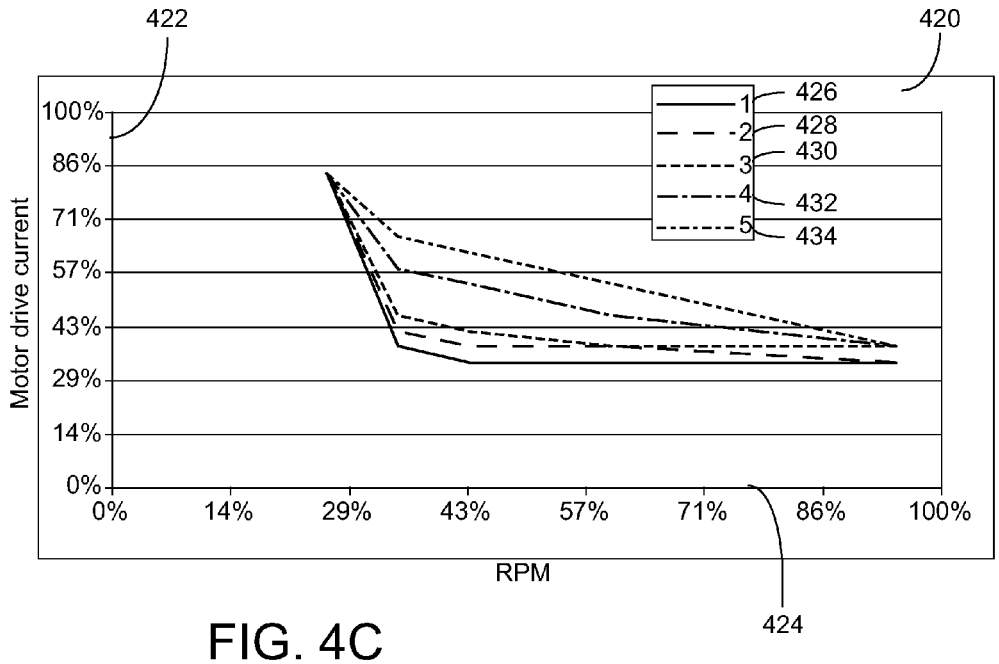
FIGS. 4C through 4F are graphical representations of the assistance provided to an engine by a motor at various driving ranges according to exemplary embodiments.

Referring now to FIGS. 4C through 4F, graphical representations of the assistance provided according to several motor assistance profiles, each associated with a different driving range, are shown according to an exemplary embodiment. Referring specifically to FIG. 4C, a graph 420 corresponding to a motor assistance profile for a shortest driving range (e.g., 40 km) is shown according to an exemplary embodiment. Graph 420 includes a rotational speed axis 424 (e.g., represented as percentage points between a minimum RPM and a maximum RPM) and a motor drive current axis 422 (e.g., represented as percentage points between a minimum drive current and a maximum drive current). In some embodiments, axis 422 may represent an output torque of the motor (e.g., when output torque is proportional to drive current). Graph 420 also includes several curves 426, 428, 430, 432, and 434 representing the average assistance provided at different RPM levels in a first, second, third, fourth, and fifth gear, respectively.

Figure 4D:
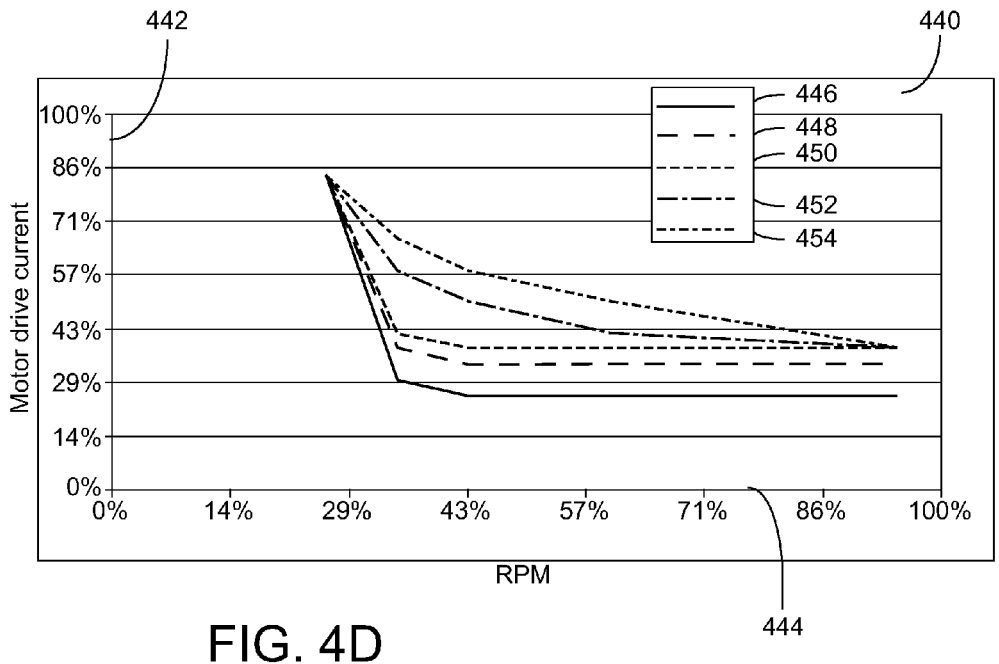
Figure 4E:
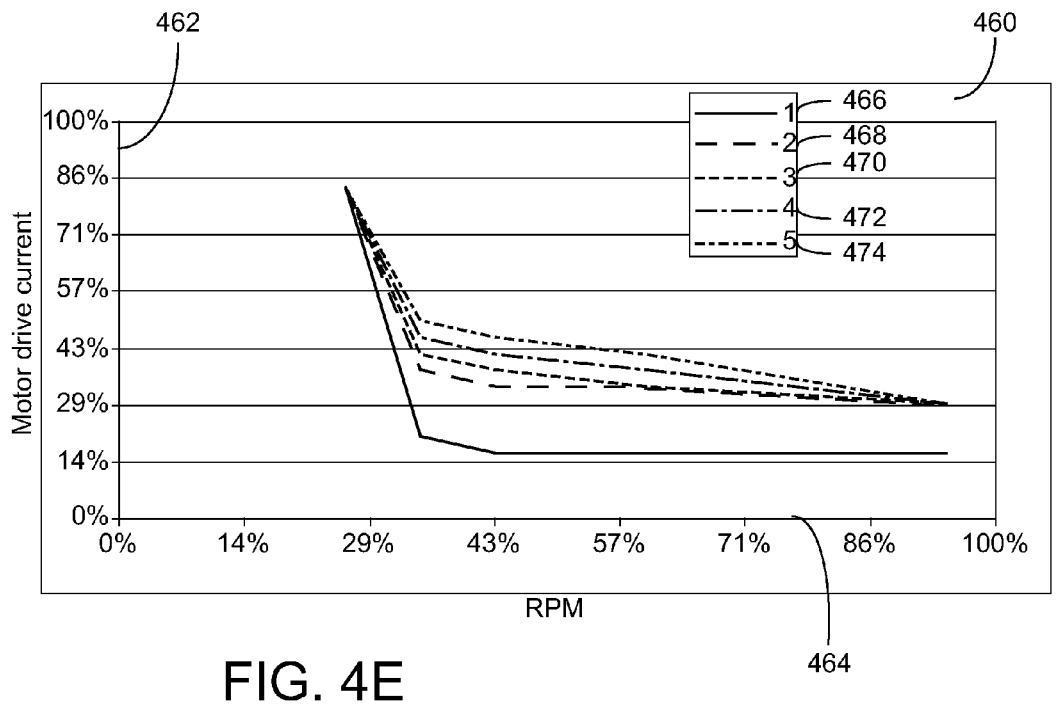
Figure 4F:
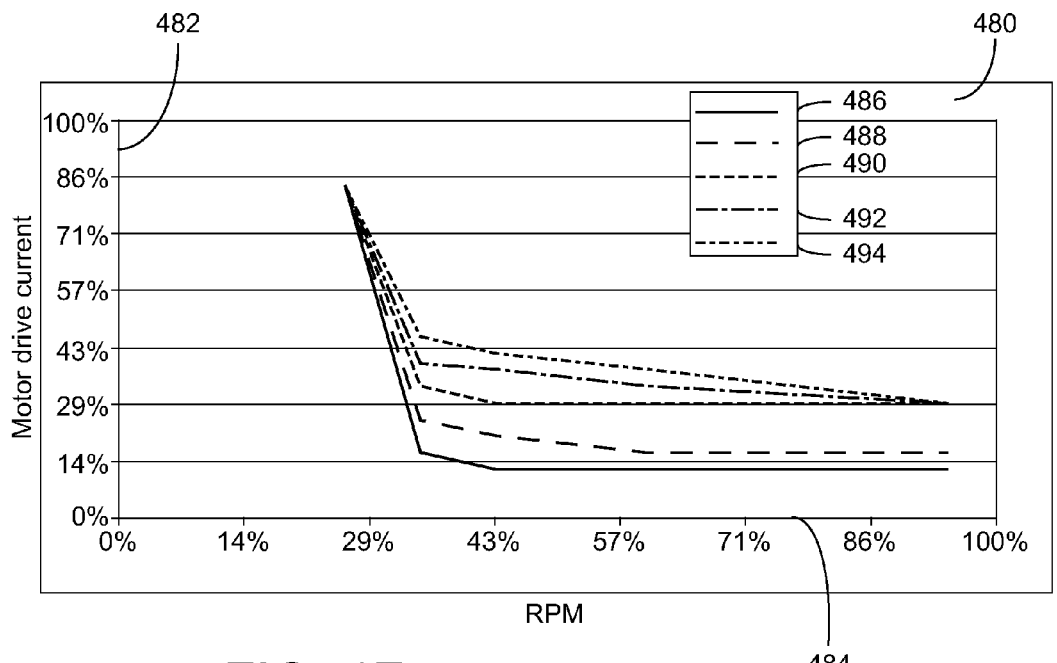

Referring now to FIGS. 4D through 4F, graphs 440, 460, and 480 are shown, respectively according to exemplary embodiments. Graphs 440, 460, and 480 correspond to motor assistance profiles for increasingly long driving ranges (e.g., 60 km, 80 km, and 100 km, respectively). Comparison of graphs 420, 440, 460, and 480 illustrates how assistance may be selectively altered based on driving range in various exemplary embodiments. For example, in graph 440, less assistance may be provided in first gear than in graph 420 (e.g., comparing first gear curve 426 for a 40 km range with first gear curve 446 for a 60 km range). The assistance provided in a middle range of gears (e.g., second, third, and/or fourth gears) may be held relatively constant between 40 km and 60 km ranges (e.g., comparing curves 428, 430, and/or 432 for a 40 km range with curves 448, 450, and/or 452 for a 60 km range). Referring to FIGS. 4E and 4F, motor assistance profiles may be designed to selectively reduce assistance at certain operating conditions (e.g., first and/or fifth gears) for increasing driving ranges before reducing assistance at other operating conditions (e.g., second, third, and/or fourth gears).

FIGS. 4C through 4F illustrate assistance levels with respect to gear positions, but it should be appreciated that the assistance provided by the motor may be based on various operating conditions (e.g., linear speed, rotational speed, etc.) and may not necessarily be based on gear positions. Graphs 420, 440, 460, and 480 are presented to illustrate how the assistance provided by the motor may be varied based on the selected driving range and are only examples of how the assistance may vary under differing conditions. It should be appreciated that various exemplary embodiments may vary the operating conditions at which assistance is provided and/or the extent of assistance in various different ways, and all such variations are intended to be within the scope of the present disclosure.

Referring again to FIG. 4A, in a different embodiment, an available (e.g., default) motor assistance profile may be altered or adjusted based on the available energy level, driving range, and/or mode (e.g., rather than selecting from among a plurality of motor assistance profiles). For example, a default motor assistance profile associated with a driving range of 60 km may be altered or optimized for a driving range of 80 km received from a user. If the driving range received from the user is shorter than the driving range associated with the default motor assistance profile (e.g., the default motor assistance profile is associated with a driving range of 60 km and the user has provided a driving range of 40 km), the default motor assistance profile may be altered to provide a greater level of assistance during some operating conditions and/or to provide assistance at some operating conditions at which assistance was not provided under the default motor assistance profile. If the available energy level determined at step 401 is higher than the energy level associated with the default motor assistance profile (e.g., the determined available energy level is 70 percent and the default motor assistance profile is associated with an available energy level of 50 percent), the default motor assistance profile may be altered to provide a greater level of assistance during some operating conditions and/or to provide assistance at some operating conditions at which assistance was not provided under the default motor assistance profile. The alteration may be based on methods such as those described with respect to FIG. 3A, such as an RPM of the engine, speed of the vehicle, gear position, acceleration, etc.

If the driving range received from the user is longer than the driving range associated with the default motor assistance profile (e.g., the default motor assistance profile is associated with a driving range of 60 km and the user has provided a driving range of 90 km), the motor assistance profile may be altered to provide a smaller level of assistance during some operating conditions and/or eliminate assistance at some conditions at which assistance is provided under the default motor assistance profile to conserve charge. If the available energy level determined at step 401 is lower than the energy level associated with the default motor assistance profile (e.g., the determined available energy level is 40 percent and the default motor assistance profile is associated with an available energy level of 50 percent), the motor assistance profile may be altered to provide a smaller level of assistance during some operating conditions and/or eliminate assistance at some conditions at which assistance is provided under the default motor assistance profile. For example, assistance may be reduced or eliminated at mid-high RPM, lower (e.g., first) and upper (e.g., fifth) gears, etc.

At step 404, the motor controller is configured to generate control signals to control the operation of the motor based on the determined motor assistance profile. The generated control signals may be provided to the motor and define how the motor will provide assistance to the engine under varying operating conditions.

In some embodiments, the motor controller may be configured to monitor (e.g., continuously, periodically, etc.) the charge level (e.g., current charge level, DOD, SOC, etc.) of the energy storage device to ensure the charge level does not exceed the maximum DOD (or, alternatively, fall below the minimum SOC). The charge level may be monitored, for example, using an input from the energy storage device, a charging device for the energy storage device, a monitoring device for the energy storage device, etc. In various embodiments, if the motor controller determines that the charge level (e.g., current DOD) is near, at, or above the maximum DOD, the motor controller may cut off power to the motor (e.g., turn off motor assistance to the engine).

In some embodiments, the hybrid system may regenerate energy into the energy storage device(s) while the motor assistance is cut off (e.g., during braking, coasting down a slope, etc.). Regeneration may result in an increase in available energy and a rise in the SOC, or reduction in the DOD, of the energy storage device(s). In some embodiments, the motor controller may be configured to reactivate motor assistance once the DOD of the energy storage device(s) returns to a level below the maximum DOD. In other embodiments, the motor controller may be configured to reactivate motor assistance if the DOD reaches or exceeds a particular threshold (e.g., user-defined, hybrid system-defined, static, dynamic, based on characteristics of the battery and/or motor, etc.) below the maximum DOD of the energy storage device(s). For example, the DOD of a battery may be 60 percent of the battery capacity and the threshold may be set at 20 percent below the maximum DOD, such that if the charge of the battery exceeded the maximum DOD of 60 percent and the motor assistance were cut off, the motor assistance would not be reactivated under the charge of the battery returned (e.g., through regeneration) to no greater than 40 percent DOD. In some embodiments, when the motor assistance is reactivated the assistance may be determined according to the same motor assistance profile utilized before the assistance was cut off.

In various other embodiments, the motor controller may be configured to select a different profile based on the monitored charge level. In some embodiments, the motor controller may be configured to choose a different profile if the charge level falls below a predetermined threshold (e.g., within 20 percent of the maximum DOD of the battery). A new profile may be chosen to direct the assistance of the motor that may be based on a lower available charge and/or a longer driving range than the motor assistance profile being used at the time the charge level fell below the threshold. For example, if the charge level fell below the threshold under a motor assistance profile associated with an available charge level of 60 percent and a driving range of 50 km, a new motor assistance profile may be selected that is associated with an available charge level of 20 percent and/or a driving range of 100 km. In other embodiments, the motor assistance profile that was active at the time the charge level fell below the threshold may be altered and/or the assistance may be reduced based on the low charge level. For example, the assistance provided to the motor at one or more operating conditions may be reduced and/or the assistance for one or more operating conditions may be eliminated.

In some embodiments, the available energy level and/or the assistance provided by the motor may be determined and/or modified based on an approximate amount of energy expected to be regenerated (e.g., during braking, coasting down a slope, etc.) by the hybrid system over the driving range. In some embodiments, the amount of energy that is expected to be regenerated may be determined based on an average (e.g., fixed) amount of energy regenerated over a certain distance (e.g., stored in a memory associated with the motor controller). For example, a vehicle utilizing the hybrid system may be known to regenerate 15 percent of the capacity of the batteries that power the motor for every 60 km driven. If the driving range for a driving cycle is 60 km, the amount of energy expected to be regenerated may be determined to be 15 percent of the capacity of the battery. If the driving range for a driving cycle is 40 km, the amount of energy expected to be regenerated may be determined to be 10 percent of the capacity of the battery.

The amount of energy that is expected to be regenerated may be determined based on historical regeneration data stored in a memory. For example, the motor controller may be configured to collect data relating to the amount of energy regenerated over driving cycles of different length and at different times (e.g., using battery charge data received, for example, from a battery charging device or battery monitoring device). In one embodiment, the motor controller may be configured to estimate the expected regenerated energy based on the energy regenerated during one or more previous driving cycles of a similar distance or driving range. For example, if a driving range of 50 km is selected, the motor controller may determine the expected regenerated energy to be the average of the regenerated energy values for a number of previous driving cycles having driving ranges near 50 km. In another embodiment, the motor controller may be configured to determine the expected regenerated energy based alternatively or additionally on regeneration data for one or more previous dates. For example, if the present driving cycle for which the expected regenerated energy is being determined is on a Wednesday, the expected regenerated energy may be determined based on regeneration data for a number of previous Wednesdays.

In some embodiments, the available energy level determined at step 401 may be increased by the amount of energy expected to be regenerated during the driving cycle. For example, if the determined available energy level is 50 percent of the capacity of a battery and the hybrid system is expected to regenerate enough energy to replenish ten percent of the battery charge, the available energy level may be set or increased to 60 percent.

In other embodiments, the assistance provided by the motor may be modified based on the energy expected to be regenerated during the driving cycle. In one embodiment, a different motor assistance profile may be chosen based on the expected regenerated energy. For example, if the available energy level determined at step 401 is 40 percent (without consideration of the expected regeneration), the driving range is 50 km, and the expected regenerated energy is 20 percent of the capacity of the battery, a motor assistance profile associated with an available energy level of 60 percent and a driving range of 50 km may be selected. In another embodiment, a selected or default motor assistance profile may be modified based on the expected regenerated energy. Greater assistance may be provided at one or more operating conditions and/or assistance may be provided at one or more operating conditions where assistance would not have been provided under the unmodified profile. In various embodiments, the assistance provided may be greater (e.g., on average) as the expected regenerated energy increases.

Referring now to FIG. 5, a graph 500 of emissions data resulting from an emissions test with assistance provided by a motor is shown according to an exemplary embodiment. The data shown in graph 500 may be obtained using a similar or same test as graph 375 of FIG. 3D (e.g., showing data for a vehicle without assistance from a motor). Graph 500 includes an emissions curve 505 representing emissions data that may be obtained for a vehicle including a hybrid system that provides selective assistance from a motor according to various exemplary embodiments described herein.

The effect of the difference between operating without assistance from a motor and operating with assistance is evident upon comparison of emissions curve 380 of graph 375 and emissions curve 505 of graph 500. Comparison of the two emissions curves clearly shows that the total emissions over the range of the emissions test are substantially lower in emissions curve 505, with selective assistance from a motor, than in emissions curve 380, with no motor assistance. Further, comparison of the two emissions curves shows that different levels of assistance are provided at different operating conditions. For example, greater assistance appears to be provided in a speed range from 25 percent to 67 percent, where the difference between emissions curves 380 and 505 is pronounced, than in a speed range of zero percent to 25 percent, where the difference between emissions curves 380 and 505 is less pronounced.

A vehicle that utilizes selective assistance from a motor, as described herein according to various exemplary embodiments, may achieve substantial reductions in emissions and/or increases in fuel economy. In one example, for a driving range of approximately 11 km, a vehicle utilizing a hybrid system that provides assistance to the engine may result in a reduction in carbon monoxide emissions of about 43 percent, a reduction in hydrocarbon emissions of about 16 percent, a reduction in nitrous oxide emissions of about 53 percent, a reduction in carbon dioxide emissions of about 35 percent, and/or an increase in fuel economy of about 55 percent as compared to a similar vehicle without motor assistance. In various other exemplary embodiments, benefits may be even more substantial depending on the assistance provided to the engine, the stored energy available to the system, the expected driving range, and/or other factors. In some embodiments, fuel economy may increase up to 130 percent or greater by utilizing assistance from a motor.

Referring now to FIGS. 6A, 6B, 7A, and 7B, graphical representations of emissions data resulting from another emissions test is shown according to various exemplary embodiments. The underlying emissions test in FIGS. 6A through 7B is different than the test underlying FIGS. 3D and 5. The underlying emissions test shown in FIGS. 6A through 7B is a driving test in which the vehicle is quickly accelerated from a stop to several different speeds and then returned to a stop after each speed is attained (as shown by speed curve 605). The vehicle is then accelerated to a higher speed (e.g., 70 percent of a highest speed in a speed range), slowed to a lower speed (e.g., 50 percent), returned to the higher speed (e.g., 70 percent), and then accelerated to an even higher speed (e.g., 90 percent) before the vehicle is brought to a stop.

Figure 6A:
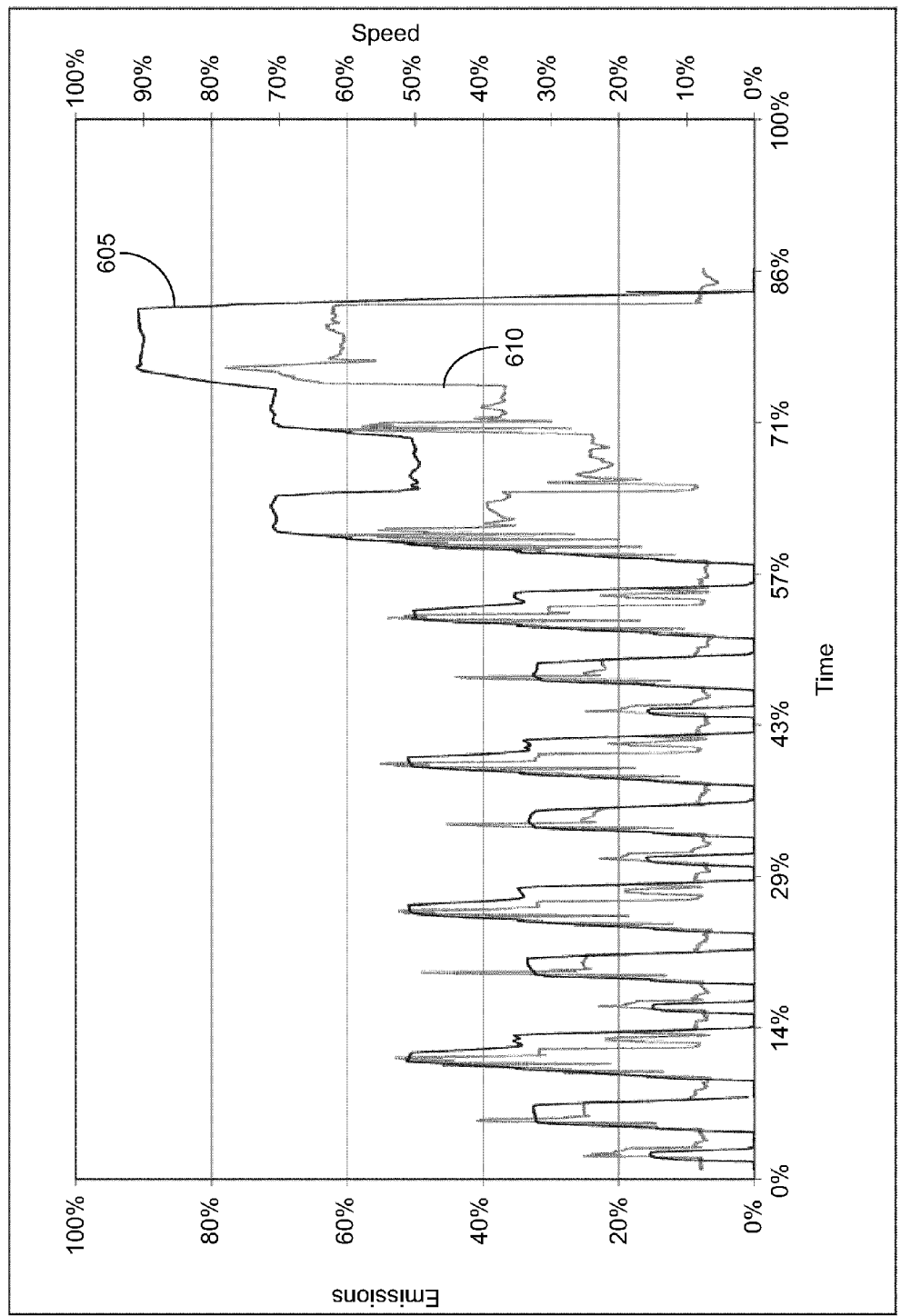
FIGS. 6A, 6B, 7A, and 7B are graphical representations of emissions data resulting from emissions tests according to various exemplary embodiments.
Figure 6B:
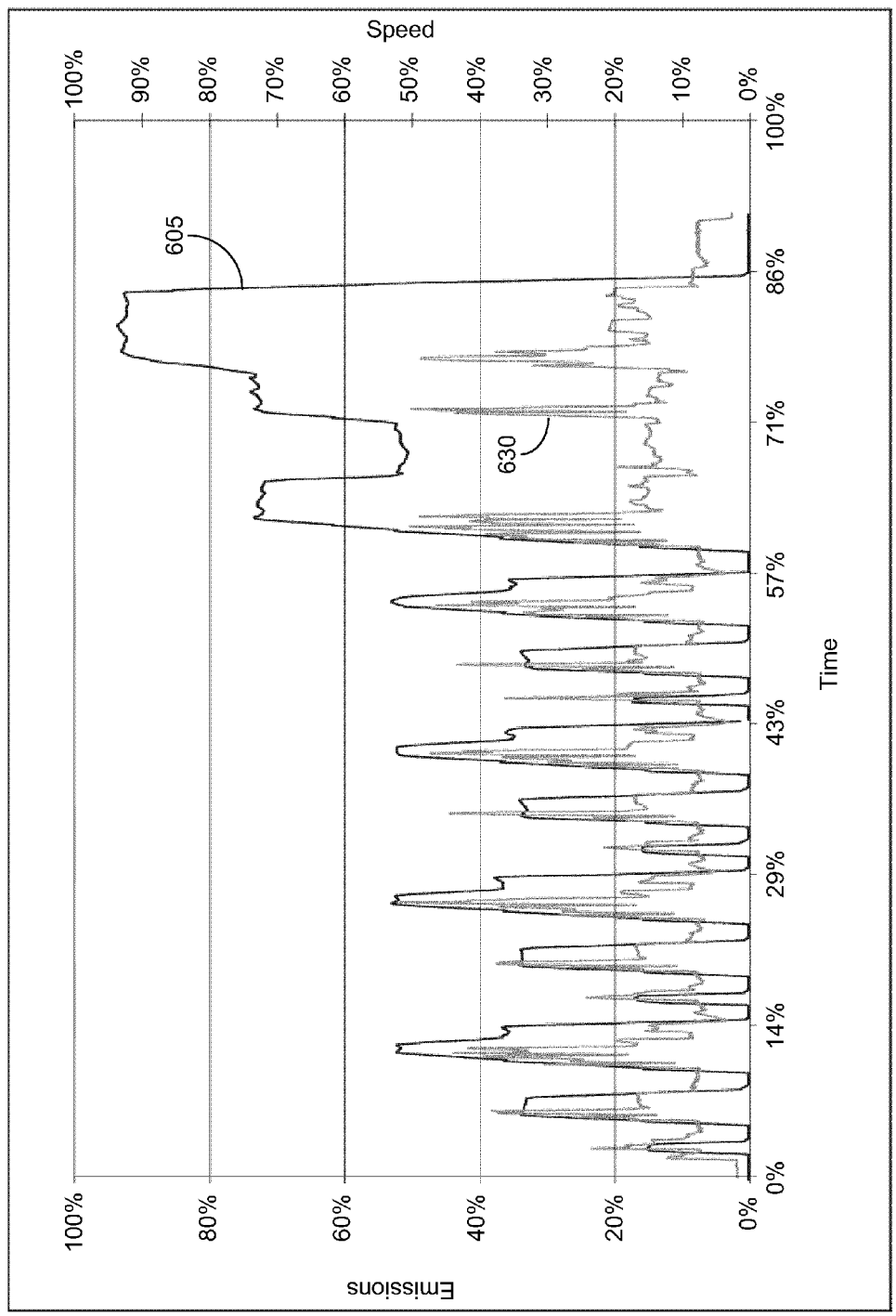

FIG. 6A includes a graph 600 that illustrates carbon dioxide emissions data that may result from running the test on a vehicle without motor assistance (e.g., a non-hybrid vehicle). Carbon dioxide emissions curve 610 is a graphical illustration of the carbon dioxide emissions data that may be obtained under such a test. FIG. 6B includes a graph 620 that illustrates carbon dioxide emissions data that may result from running the test on a similar vehicle with motor assistance (e.g., in a hybrid mode). Carbon dioxide emissions curve 630 is a graphical illustration of the carbon dioxide emissions data that may be obtained under the test in a hybrid mode utilizing features as discussed herein. Comparison of emissions curves 610 and 630 demonstrates that carbon dioxide emissions may be selectively reduced at several different operating conditions by utilizing assistance from a motor.

Figure 7A:
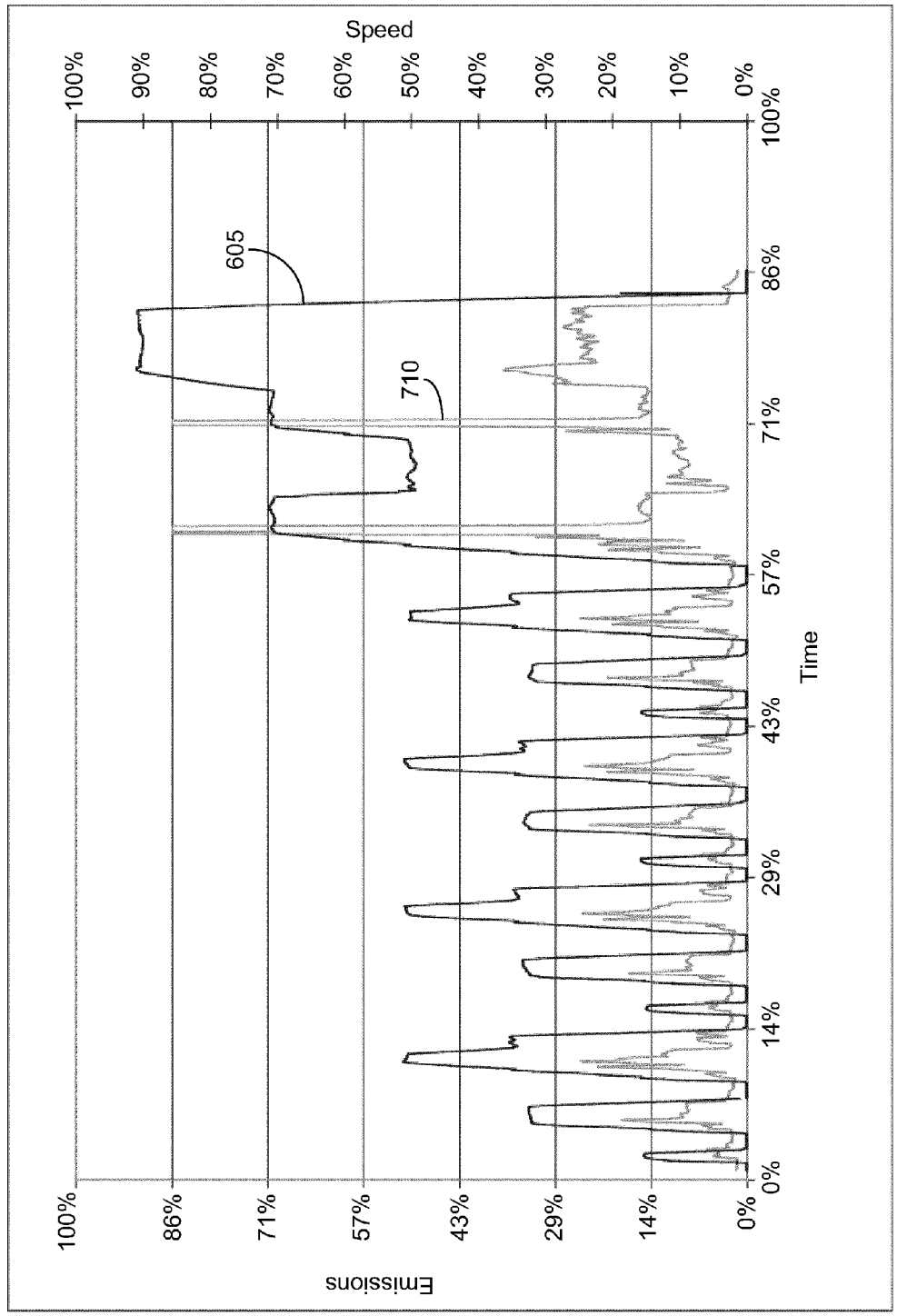
Figure 7B:
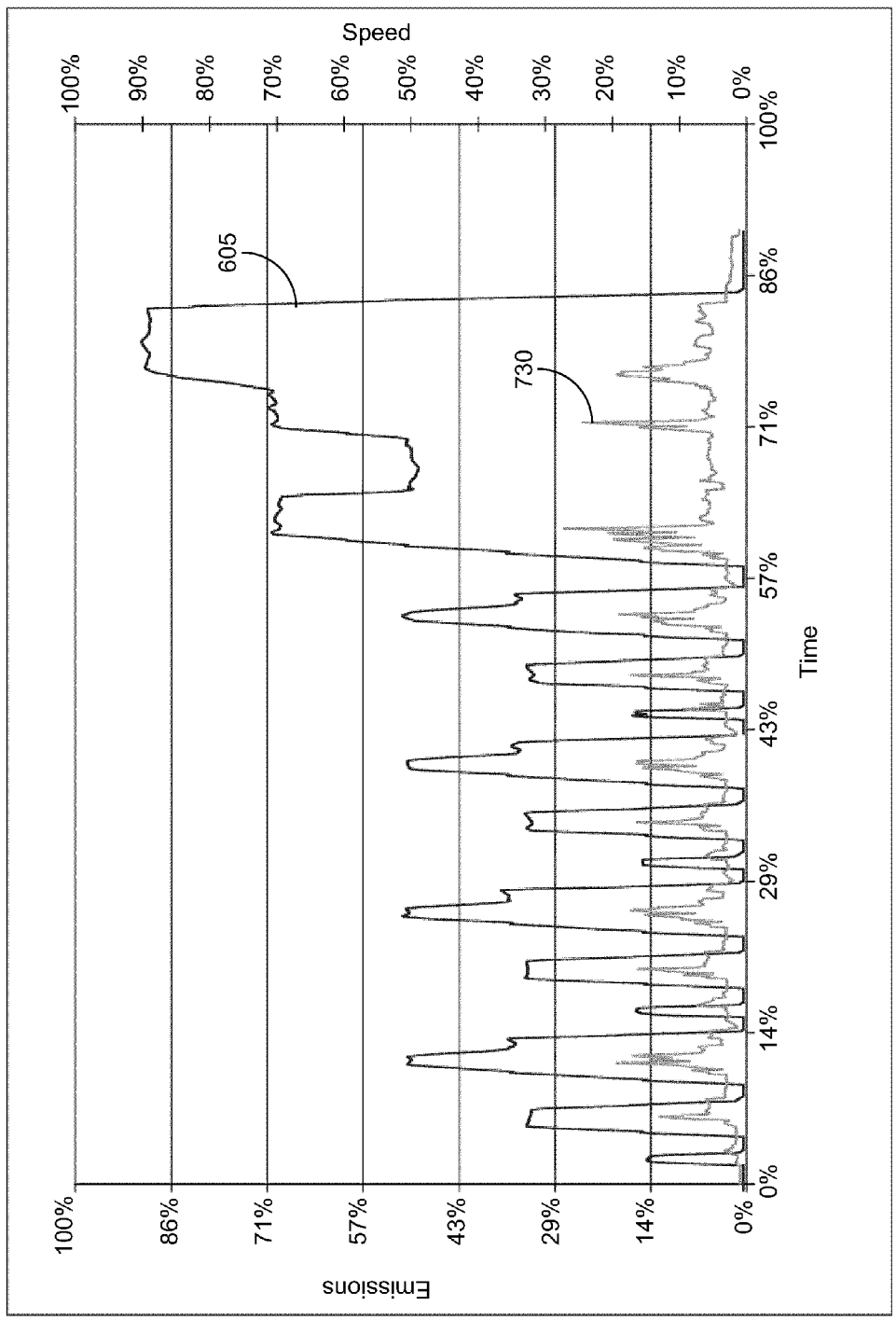
Figure 8E:
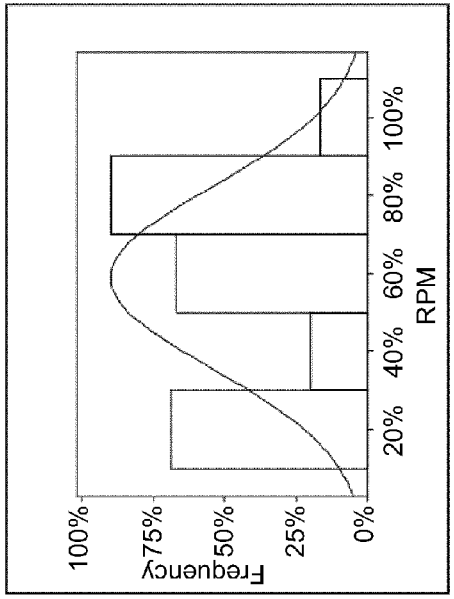
FIGS. 8E through 8H are histograms related to the data represented in FIGS. 8A through 8D, respectively, according to exemplary embodiments.
Figure 8F:
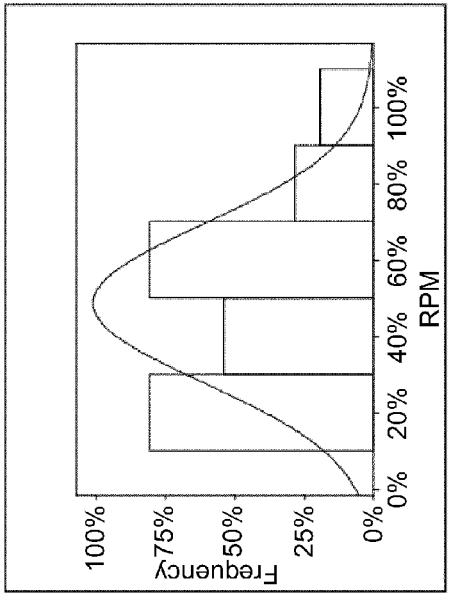
Figure 8G:
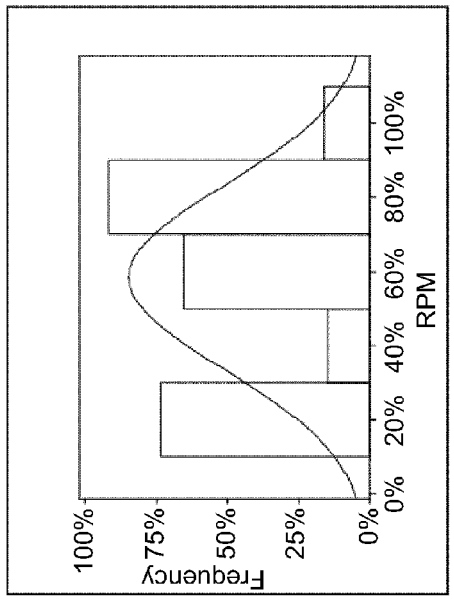
Figure 8H:
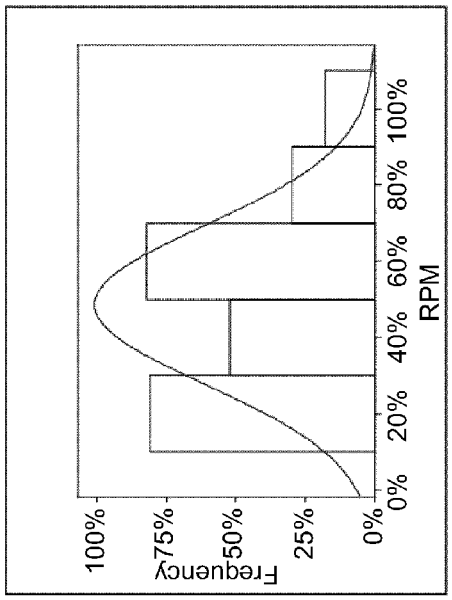

FIG. 7A includes a graph 700 that illustrates carbon monoxide emissions data that may result from running the test on a non-hybrid vehicle. Carbon monoxide emissions curve 710 is a graphical illustration of the carbon monoxide emissions data that may be obtained under such a test. FIG. 7B includes a graph 720 that illustrates carbon monoxide emissions data that may result from running the test on a similar vehicle with motor assistance (e.g., in a hybrid mode). Carbon monoxide emissions curve 730 is a graphical illustration of the carbon monoxide emissions data that may be obtained under the test in a hybrid mode utilizing features as discussed herein. Comparison of emissions curves 710 and 730 demonstrates that carbon monoxide emissions may also be selectively reduced at several different operating conditions by utilizing assistance from a motor.

Referring now to FIGS. 8A through 8D, four graphs 800, 805, 810, and 815 are provided illustrating sample results that may be attained by utilizing various exemplary embodiments of a hybrid system as discussed herein with respect to FIGS. 1 through 4F. The x-axes of graphs 500 800, 805, 810, and 815 represent rotational speed in percentage increments between a minimum RPM and a maximum RPM. The y-axes of graphs 800, 805, 810, and 815 represent the load on the engine (e.g., measured in manifold absolute pressure, or MAP) in percentage increments between a minimum load and a maximum load. Each of the dots displayed on graphs 800, 805, 810, and 815 represent data points collected at different points in time and/or different operating conditions during a driving simulation test.

Referring now specifically to FIGS. 8A and 8B, two graphs 800 and 805 illustrate exemplary data for a non-hybrid vehicle or a vehicle in which a hybrid mode is not activated. Graph 800 illustrates data for a non-hybrid vehicle being operated with the air conditioning system turned on, and graph 805 illustrates data for a non-hybrid vehicle being operated with the air conditioning system turned off Graphs 800 and 805 reflect data for an engine that is receiving no assistance from a motor. The data points shown in graphs 800 and 805 are concentrated largely at relatively high rotational speeds, indicating that the engine is frequently operating at a high RPM.

Referring now to FIGS. 8C and 8D, graphs 810 and 815 illustrate exemplary data for a vehicle (e.g., the same or a similar vehicle) in which a hybrid system such as that described with respect to FIGS. 1 through 4F is active and assistance is being provided to the engine by a motor. Graph 810 illustrates data for a hybrid vehicle being operated with the air conditioning turned on, and graph 815 illustrates data for a hybrid vehicle with optimum gear shifting (e.g., where the vehicle was shifted between gears at the most efficient times and/or operating conditions). The data points in graphs 810 and 815 are generally concentrated at lower rotational speeds than in graphs 800 and 805, indicating that the engine is more frequently operating in a lower RPM range than when the hybrid system is not activated (e.g., as shown in graphs 800 and 805).

The effect of the difference between operating without assistance from a motor and operating with assistance is evident upon comparison of FIGS. 8A through 8D with FIG. 3B. Referring to FIG. 3B, an engine is more frequently operating in a more efficient zone of operation when it is running at a lower RPM. Comparing each of FIGS. 8A through 8D with FIG. 3B (e.g., FIGS. 8A and 8C), it can be seen that a larger amount of data points are within more efficient zones of operation in FIGS. 8C and 8D (e.g., reflecting assistance provided by the motor) than in FIGS. 8A and 8B (e.g., reflecting no provided assistance).

The effect of the assistance is further evident upon comparison of the data in FIGS. 8E through 8H. FIGS. 8E through 8H illustrate histograms related to the data represented in FIGS. 8A through 8D, respectively, according to exemplary embodiments. FIGS. 8E through 8H include histograms 820, 825, 830, and 835, generated based on the distribution of data points shown in graphs 800, 805, 810, and 815, respectively. Histograms 820, 825, 830, and 835 provide another method for analyzing the frequency with which the engine is operating at different RPM ranges in the exemplary embodiments shown in FIGS. 8A through 8D. Comparison of histograms 820 and 825 with histograms 830 and 835 demonstrates that the engine may more frequently operate at a lower RPM when receiving assistance from a motor than when no assistance is received. As discussed with respect to FIG. 3C, an engine may operate in a more efficient zone of operation when it runs at a lower RPM.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

It should be noted that the orientation of various elements may differ according to other exemplary embodiments, and that such variations are intended to be encompassed by the present disclosure.

It is important to note that the construction and arrangement of elements shown in the various exemplary embodiments is illustrative only. Other substitutions, modifications, changes and omissions may also be made in the design and arrangement of the various exemplary embodiments without departing from the scope of the present disclosure.

The present disclosure contemplates methods, systems and program products on any machine-readable media for accomplishing various operations. The embodiments of the present disclosure may be implemented using existing integrated circuits, computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. In various embodiments, more, less or different steps may be utilized with respect to a particular method without departing from the scope of the present disclosure. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of providing assistance to an internal combustion engine for a vehicle using an electric motor coupled to the engine, the method comprising:
   selectively operating the motor to provide assistance to the engine at predetermined operating conditions of the engine, wherein the assistance provided to the engine at one or more of the predetermined operating conditions is determined based on one of a plurality of motor assistance profiles, wherein the motor assistance profile upon which the assistance is determined is selected from among the plurality of motor assistance profiles based on an expected driving range provided by a user of the vehicle, the expected driving range indicating a distance the vehicle is expected to be driven before charging of a motor battery;
   wherein each of the plurality of motor assistance profiles comprises a lookup table having stored therein a plurality of data elements, wherein each of the plurality of data elements is associated with a different combination of one or more linear speeds and one or more rotational speeds, and wherein the assistance provided to the engine at a particular linear speed and rotational speed is determined based at least in part on the data element of the selected motor assistance profile that is associated with the particular linear speed and rotational speed;
   wherein a first motor assistance profile is selected when the expected driving range indicates that the vehicle is expected to be driven a first distance;
   wherein a second motor assistance profile is selected when the expected driving range indicates that the vehicle is expected to be driven a second distance that is greater than the first distance; and
   wherein the first motor assistance profile is configured to cause the motor to provide a different amount of assistance than the second motor assistance profile at one or more of the predetermined operating conditions of the engine.

2. The method of claim 1, wherein the assistance provided to the engine at one or more of the predetermined operating conditions is determined based at least in part on an available energy level of an energy storage device configured to provide power to the electric motor, wherein the available energy level is based on the difference between a starting energy level and a minimum energy level, and wherein the minimum energy level is higher than a lowest possible energy level for the energy storage device such that the available energy level is less than a total energy that may be stored in the energy storage device.

3. The method of claim 2, wherein the assistance provided to the engine at one or more of the predetermined operating conditions is determined based at least in part on an amount of energy expected to be regenerated over the expected driving range, wherein the amount of energy expected to be regenerated is predicted based on an amount of energy regenerated during one or more previous driving cycles.

4. The method of claim 2, further comprising monitoring a present energy level of the energy storage device, wherein the assistance provided to the engine at one or more of the predetermined operating conditions is varied based on the present energy level.

5. The method of claim 4, wherein assistance to the engine is deactivated when the present energy level is below a minimum energy level.

6. The method of claim 5, further comprising reactivating assistance from the motor when assistance has been deactivated and the present energy level exceeds a threshold energy level.

7. The method of claim 2, wherein the motor assistance profile upon which the assistance is determined is selected from among the plurality of motor assistance profiles further based on the available energy level of the energy storage device.

8. The method of claim 1, wherein at least one of the plurality of the motor assistance profiles is generated by altering a default motor assistance profile based on the expected driving range provided by the user.

9. The method of claim 1, further comprising determining acceleration data for the vehicle based on input received from one or more sensors, wherein one or more control signals are configured to control the electric motor to provide at least one pulse of assistance at one or more times when the acceleration data indicates a demand for acceleration by operating the electric motor at a current above a continuous current rating of the electric motor.

10. The method of claim 1, wherein the electric motor is coupled to a crankshaft of the engine at a first side of the engine and a transmission is coupled to the crankshaft at a second side of the engine opposite the first side.

11. A motor controller, comprising:
   one or more processors configured to execute instructions stored on one or more computer-readable media, wherein the instructions are executable by the one or more processors to selectively operate an electric motor to provide assistance to an internal combustion engine at predetermined operating conditions of the engine, wherein the assistance provided to the engine at one or more of the predetermined operating conditions is determined based on one of a plurality of motor assistance profiles, and wherein the motor assistance profile upon which the assistance is determined is selected from among the plurality of motor assistance profiles based on an expected driving range provided by a user of the vehicle, the expected driving range indicating a distance the vehicle is expected to be driven before charging of a motor battery;
   wherein each of the plurality of motor assistance profiles comprises a lookup table having stored therein a plurality of data elements, wherein each of the plurality of data elements is associated with a particular range of one or more operating conditions of the vehicle, and wherein the assistance provided to the engine at a particular set of operating conditions of the vehicle is determined based at least in part on the data element of the selected motor assistance profile that is associated with the particular set of operating conditions;
   wherein a first motor assistance profile is selected when the expected driving range indicates that the vehicle is expected to be driven a first distance;
   wherein a second motor assistance profile is selected when the expected driving range indicates that the vehicle is expected to be driven a second distance that is greater than the first distance; and
   wherein the first motor assistance profile is configured to cause the motor to provide a different amount of assistance than the second motor assistance profile at one or more of the predetermined operating conditions of the engine.

12. The motor controller of claim 11, wherein the assistance provided to the engine at one or more of the predetermined operating conditions is determined based at least in part on an available energy level of an energy storage device configured to provide power to the electric motor, wherein the available energy level is based on the difference between a starting energy level and a minimum energy level, and wherein the minimum energy level is higher than a lowest possible energy level for the energy storage device such that the available energy level is less than a total energy that may be stored in the energy storage device.

13. The motor controller of claim 12, wherein the assistance provided to the engine at one or more of the predetermined operating conditions is determined based at least in part on an amount of energy expected to be regenerated over the expected driving range, and wherein the amount of energy expected to be regenerated is predicted based on an amount of energy regenerated during one or more previous driving cycles.

14. The motor controller of claim 12, wherein a present energy level of the energy storage device is monitored, and wherein the assistance provided to the engine at one or more of the predetermined operating conditions is varied based on the present energy level.

15. The motor controller of claim 14, wherein assistance to the engine is deactivated when the present energy level is below a minimum energy level.

16. The motor controller of claim 15, wherein assistance to the engine is reactivated when assistance has been deactivated and the present energy level exceeds a threshold energy level.

17. The motor controller of claim 12, wherein the motor assistance profile upon which the assistance is determined is selected from among the plurality of motor assistance profiles further based on the available energy level of the energy storage device.

18. The motor controller of claim 11, wherein acceleration data for the vehicle is determined based on input received from one or more sensors, wherein one or more control signals are configured to control the electric motor to provide at least one pulse of assistance at one or more times when the acceleration data indicates a demand for acceleration by operating the electric motor at a current above a continuous current rating of the electric motor.

19. The motor controller of claim 11, wherein the electric motor is coupled to a crankshaft of the engine at a first side of the engine and a transmission is coupled to the crankshaft at a second side of the engine opposite the first side.

20. A hybrid drive system for a vehicle, comprising:
an electric motor configured to provide assistance to an internal combustion engine to provide driving power for the vehicle; and
a controller configured to control an operation of an electric motor, wherein the controller comprises one or more processors configured to execute instructions stored on one or more computer-readable media;
wherein the instructions are executable by the one or more processors to selectively operate an electric motor to provide assistance to an internal combustion engine at predetermined operating conditions of the engine;
wherein the assistance provided to the engine at one or more of the predetermined operating conditions is determined based on one of a plurality of motor assistance profiles, wherein each of the plurality of motor assistance profiles comprises a plurality of data elements, wherein each of the plurality of data elements is associated with a different combination of at least one of one or more linear speeds or one or more rotational speeds, and
wherein the assistance provided to the engine at one or more of a particular linear speed or a particular rotational speed is determined based at least in part on the data element of the selected motor assistance profile that is associated with the one or more of the particular linear speed and the particular rotational speed;
wherein the motor assistance profile upon which the assistance is determined is selected from among the plurality of motor assistance profiles based on an expected driving range provided by a user of the vehicle, the expected driving range indicating a distance the vehicle is expected to be driven before charging of a motor battery;
wherein a first motor assistance profile is selected when the expected driving range indicates that the vehicle is expected to be driven a first distance;
wherein a second motor assistance profile is selected when the expected driving range indicates that the vehicle is expected to be driven a second distance that is greater than the first distance; and
wherein the first motor assistance profile is configured to cause the motor to provide a different amount of assistance than the second motor assistance profile at one or more of the predetermined operating conditions of the engine.

21. The hybrid drive system of claim 20, wherein the assistance provided to the engine at one or more of the predetermined operating conditions is determined based at least in part on an available energy level of an energy storage device configured to provide power to the electric motor, wherein the available energy level is based on the difference between a starting energy level and a minimum energy level, and wherein the minimum energy level is higher than a lowest possible energy level for the energy storage device such that the available energy level is less than a total energy that may be stored in the energy storage device.

22. The hybrid drive system of claim 21, wherein the assistance provided to the engine at one or more of the predetermined operating conditions is determined based at least in part on an amount of energy expected to be regenerated over the expected driving range, and wherein the amount of energy expected to be regenerated is predicted based on an amount of energy regenerated during one or more previous driving cycles.

23. The hybrid drive system of claim 21, wherein a present energy level of the energy storage device is monitored, wherein the assistance provided to the engine at one or more of the predetermined operating conditions is varied based on the present energy level.

24. The hybrid drive system of claim 23, wherein assistance to the engine is deactivated when the present energy level is below a minimum energy level.

25. The hybrid drive system of claim 24, wherein assistance to the engine is reactivated when assistance has been deactivated and the present energy level exceeds a threshold energy level.

26. The hybrid drive system of claim 21, wherein the motor assistance profile upon which the assistance is determined is selected from among the plurality of motor assistance profiles further based on the available energy level of the energy storage device.

27. The hybrid drive system of claim 20, wherein acceleration data for the vehicle is determined based on input received from one or more sensors, wherein one or more control signals are configured to control the electric motor to provide at least one pulse of assistance at one or more times when the acceleration data indicates a demand for acceleration by operating the electric motor at a current above a continuous current rating of the electric motor.

28. The hybrid drive system of claim 20, wherein the electric motor is coupled to a crankshaft of the engine, wherein the electric motor is coupled to the crankshaft at a first side of the engine and a transmission is coupled to the crankshaft at a second side of the engine opposite the first side.

29. The method of claim 1, wherein a first average assistance amount provided to the engine when the first motor assistance profile is selected is greater than a second average assistance amount provided by the engine when the second motor assistance profile is selected.

30. The method of claim 1, further comprising generating the plurality of motor assistance profiles based on emissions data associated with an engine type of the engine across a range of operating conditions.

31. The method of claim 1, wherein the predetermined operating conditions upon which the plurality of motor assistance profiles are based comprise one or both of a gear position of a transmission of the vehicle and an acceleration of the vehicle.

32. The method of claim 1, further comprising selecting the motor assistance profile upon which the assistance is determined based on a selected mode of a plurality of modes, wherein the plurality of modes comprise an economy mode in which assistance is provided in a manner that increases fuel economy of the vehicle and a power mode in which assistance is provided in a manner that provides extra power for driving the vehicle.

33. The method of claim 1, further comprising selecting the motor assistance profile upon which the assistance is determined based on a date or a type of day.

34. The method of claim 1, further comprising selecting the motor assistance profile upon which the assistance is determined based on the expected driving range, an available energy level of an energy storage device configured to provide power to the electric motor, and a selected mode of a plurality of modes, wherein the plurality of modes comprise an economy mode in which assistance is provided in a manner that increases fuel economy of the vehicle and a power mode in which assistance is provided in a manner that provides extra power for driving the vehicle.

\* \* \* \* \*